(12) United States Patent
Sepke et al.

(10) Patent No.: US 7,967,884 B2
(45) Date of Patent: Jun. 28, 2011

(54) BAGLESS DUSTCUP

(75) Inventors: Arnold L. Sepke, Hudson, IL (US);
Joseph Mulcahy, Bloomington, IL (US);
Joyce Thomas, Lexington, IL (US)

(73) Assignee: Electrolux Home Care Products, Inc., Cleveland, OH (US)

( * ) Notice: Subject to any disclaimer, the term of this patent is extended or adjusted under 35 U.S.C. 154(b) by 0 days.

(21) Appl. No.: 12/851,118

(22) Filed: Aug. 5, 2010

(65) Prior Publication Data

US 2010/0293744 A1 Nov. 25, 2010

Related U.S. Application Data

(63) Continuation of application No. 12/632,238, filed on Dec. 7, 2009, which is a continuation of application No. 12/206,259, filed on Sep. 8, 2008, now Pat. No. 7,628,832, which is a continuation of application No. 11/617,827, filed on Dec. 29, 2006, now Pat. No. 7,422,614, which is a continuation of application No. 11/035,413, filed on Jan. 14, 2005, now Pat. No. 7,163,568, which is a continuation of application No. 10/429,298, filed on May 5, 2003, now Pat. No. 6,863,702, which is a continuation of application No. 09/759,396, filed on Jan. 12, 2001, now Pat. No. 6,558,453.

(60) Provisional application No. 60/176,356, filed on Jan. 14, 2000.

(51) Int. Cl.
*B01D 50/00* (2006.01)
(52) U.S. Cl. ........... 55/337; 55/429; 55/DIG. 3; 15/347; 15/350
(58) Field of Classification Search .................... 55/337, 55/429, DIG. 3; 15/347, 350, 353
See application file for complete search history.

(56) References Cited

U.S. PATENT DOCUMENTS 6,775,882 B2 * 8/2004 Murphy et al. ................. 15/352
* cited by examiner

*Primary Examiner* — Robert A Hopkins
(74) *Attorney, Agent, or Firm* — Hunton & Williams

(57) ABSTRACT

A bagless vacuum cleaner system dustcup assembly and method for using said system with a vacuum cleaner apparatus to separate dirt from a mixture of dirt and air inducted into said vacuum cleaner apparatus. Said bagless vacuum cleaner system generally comprises a dustcup assembly, a handle assembly and a motor intake adaptor.

20 Claims, 27 Drawing Sheets

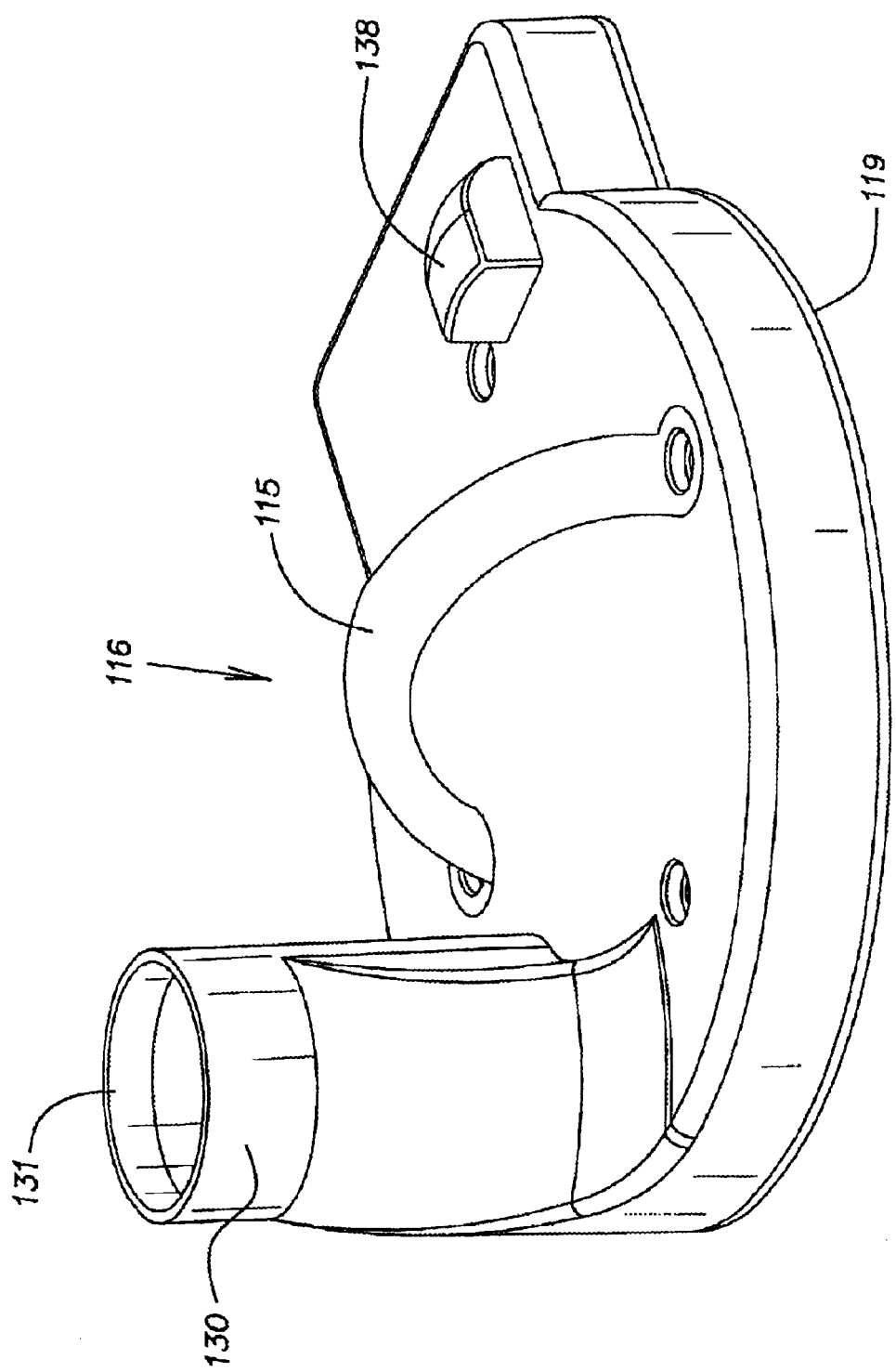

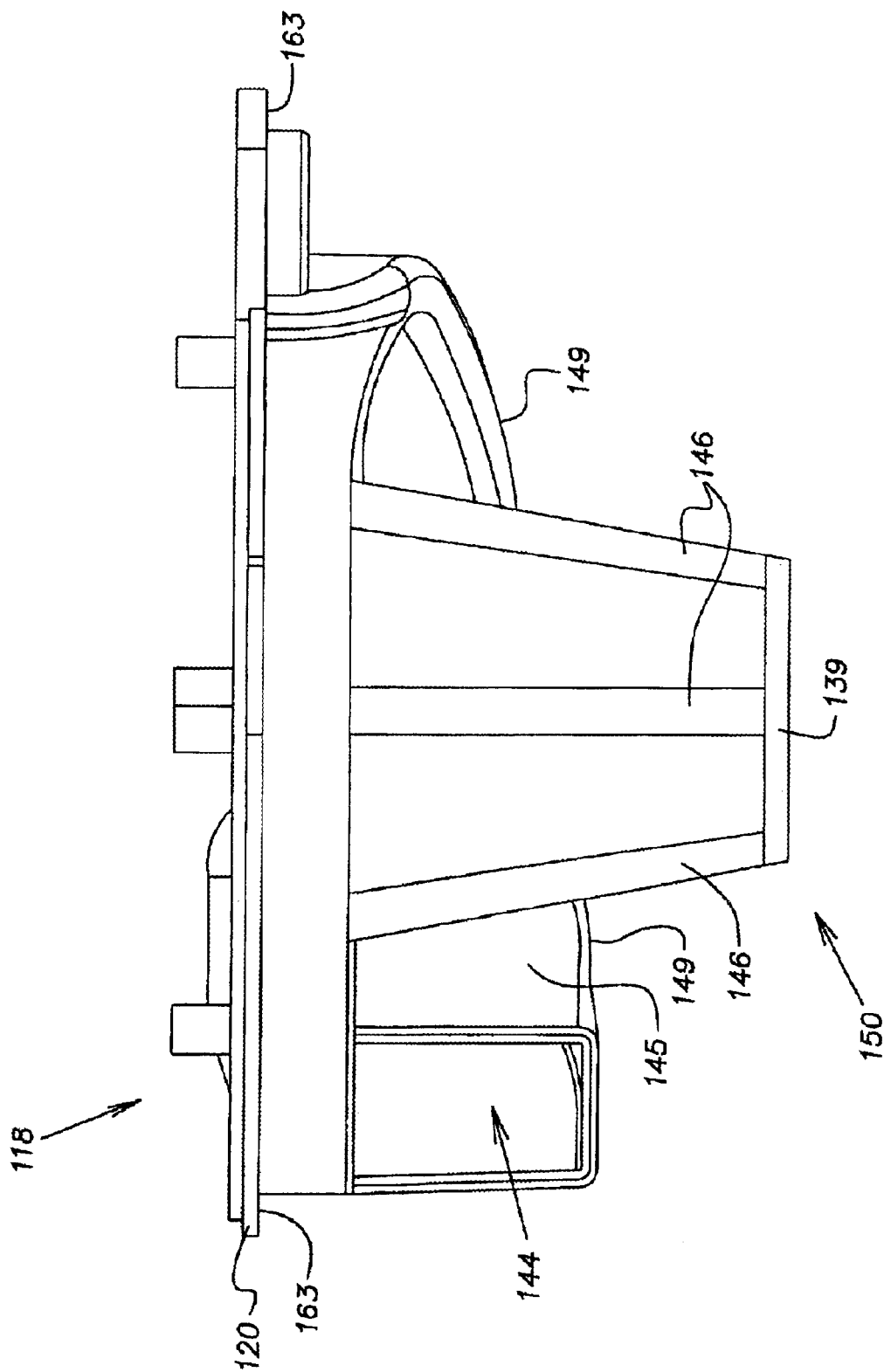

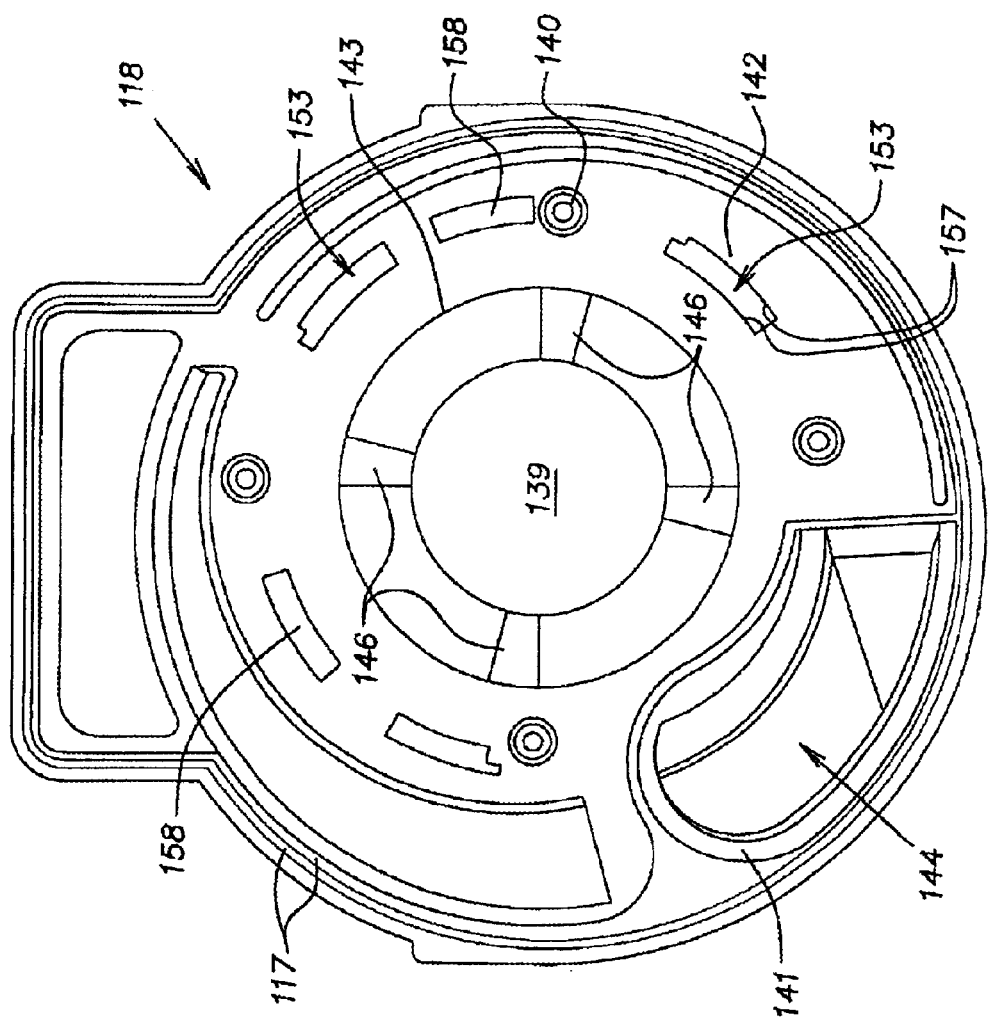

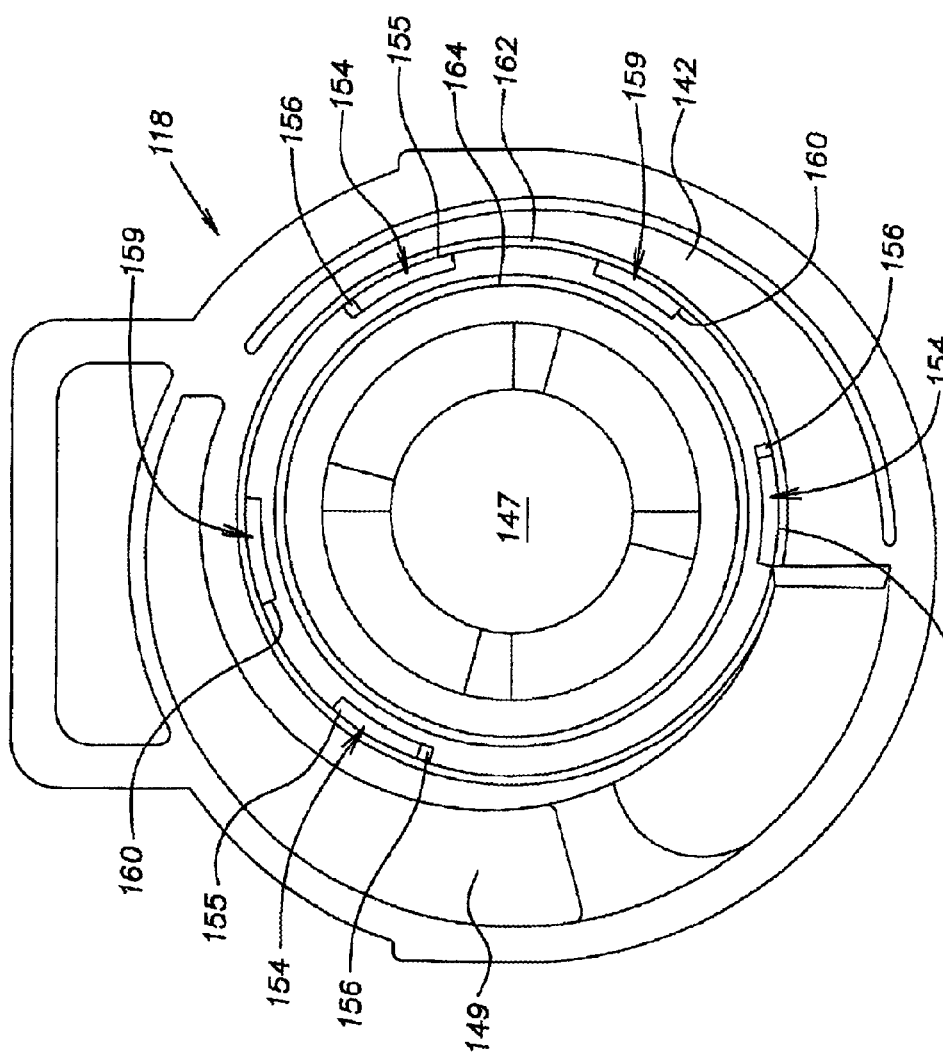

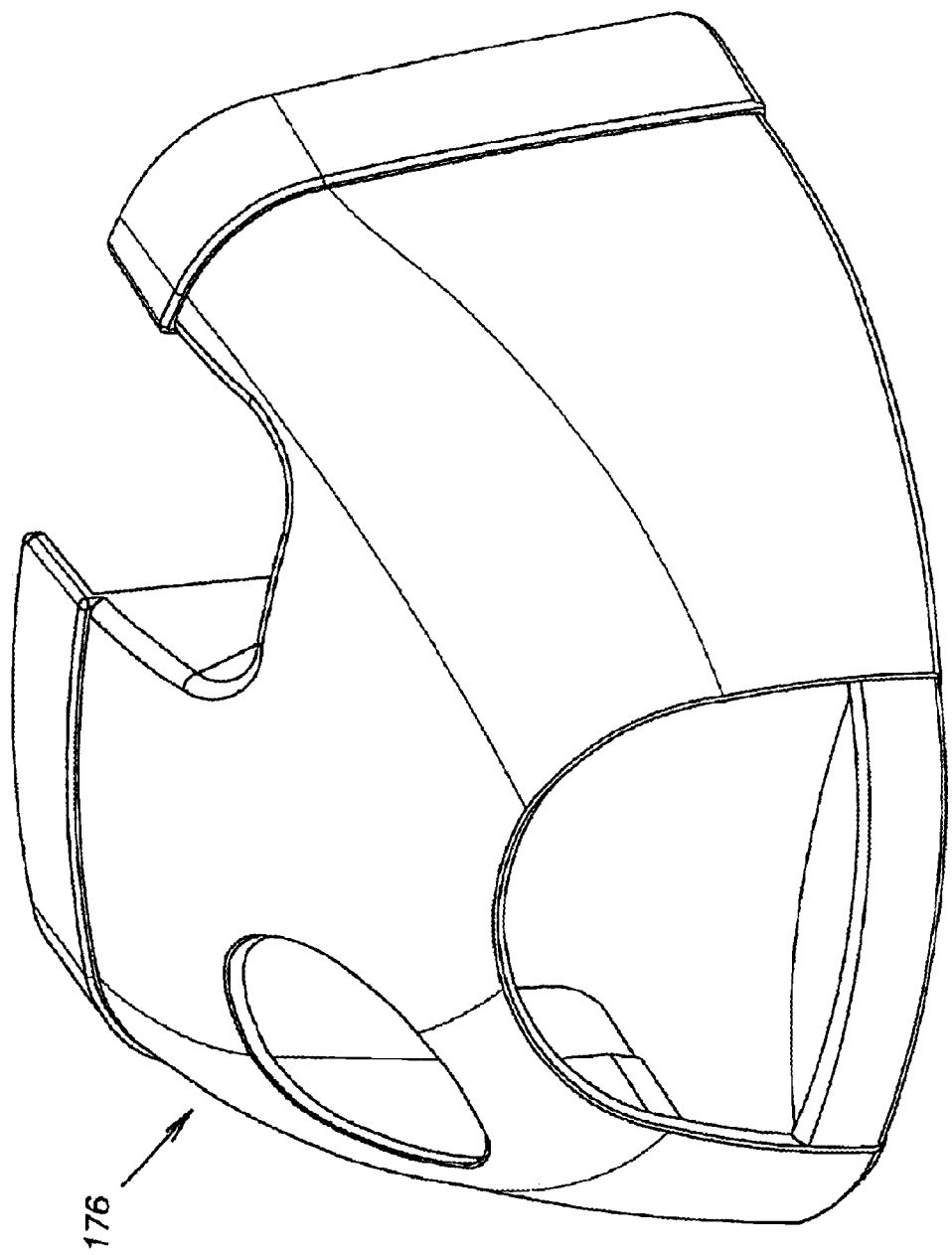

BAGLESS DUSTCUP

This application is a continuation of U.S. application Ser. No. 12/632,238 filed Dec. 7, 2009, which is a continuation of U.S. application Ser. No. 12/206,259 filed Sep. 8, 2008, now U.S. Pat. No. 7,628,832, which is a continuation of U.S. application Ser. No. 11/617,827 filed Dec. 29, 2006, now U.S. Pat. No. 7,422,614, which is a continuation of U.S. application Ser. No. 11/035,413 filed Jan. 14, 2005, now U.S. Pat. No. 7,163,568, which is a continuation of U.S. application Ser. No. 10/429,298, filed May 5, 2003, now U.S. Pat. No. 6,863,702, which is a continuation of U.S. application Ser. No. 09/759,396, filed Jan. 12, 2001, now U.S. Pat. No. 6,558,453, which claims the benefit of U.S. Provisional Application No. 60/176,356, filed Jan. 14, 2000.

FIELD OF THE INVENTION

The present invention relates to vacuum cleaners, and more particularly, to a bagless dust cup assembly to be used in lieu of a disposable dirt collection bag with an upright vacuum cleaner apparatus.

BACKGROUND OF THE INVENTION

The present invention is directed toward an improved air/dirt separation system for an upright vacuum cleaner. The invention is further directed toward an assembly that may be retrofitted into an existing bag-style upright cleaner. The assembly according to the invention replaces a disposable bag system with an easy-empty permanent dustcup and cleanable permanent filter. Although the system successfully supplants the throwaway dustbag in this retro-fit application, the broader scope of the invention contemplates creation of an entirely new vacuum system that is dedicated to the bagless concept. Alternatively, by substitution of components, it is contemplated that the assembly of the present invention may be used to configure an upright vacuum cleaner that is adapted for either bag or bagless use.

BRIEF DESCRIPTION OF THE DRAWINGS

FIG. 1b is a cross sectional view of the cleaner as seen along line B-B of FIG. 1a;

FIG. 4a is a top and side perspective view of a plenum chamber member;

FIG. 5b is a side elevational view of the cyclone module;

FIG. 5c is a top plan view of the cyclone module;

FIG. 5d is a bottom view of the cyclone module;

FIG. 10 is a front perspective view of a cover;

DETAILED DESCRIPTION OF THE PREFERRED EMBODIMENT

Figure 1A:
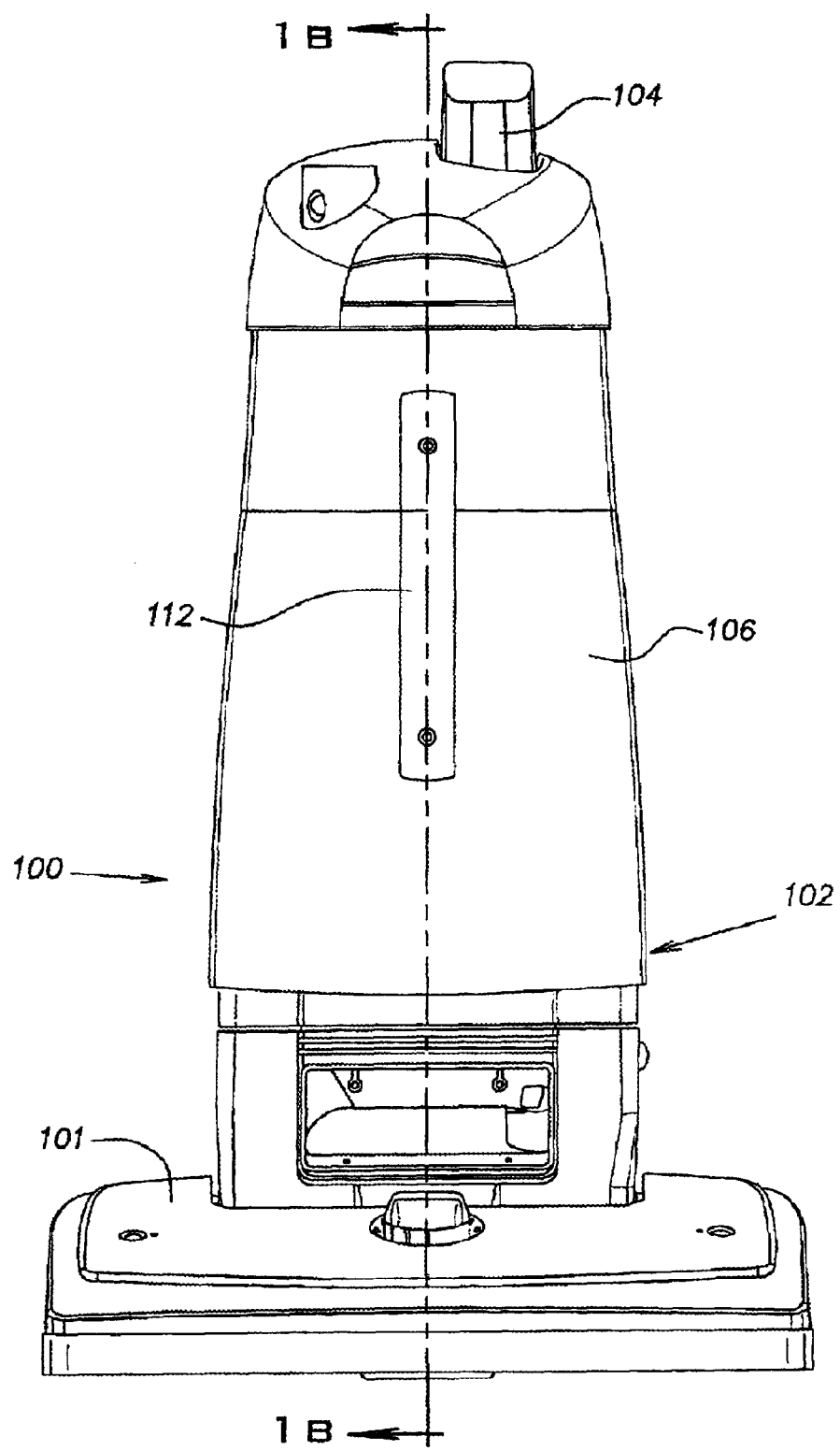
FIG. 1a is a front elevational view of a vacuum cleaner according to the present invention.
Figure 1B:
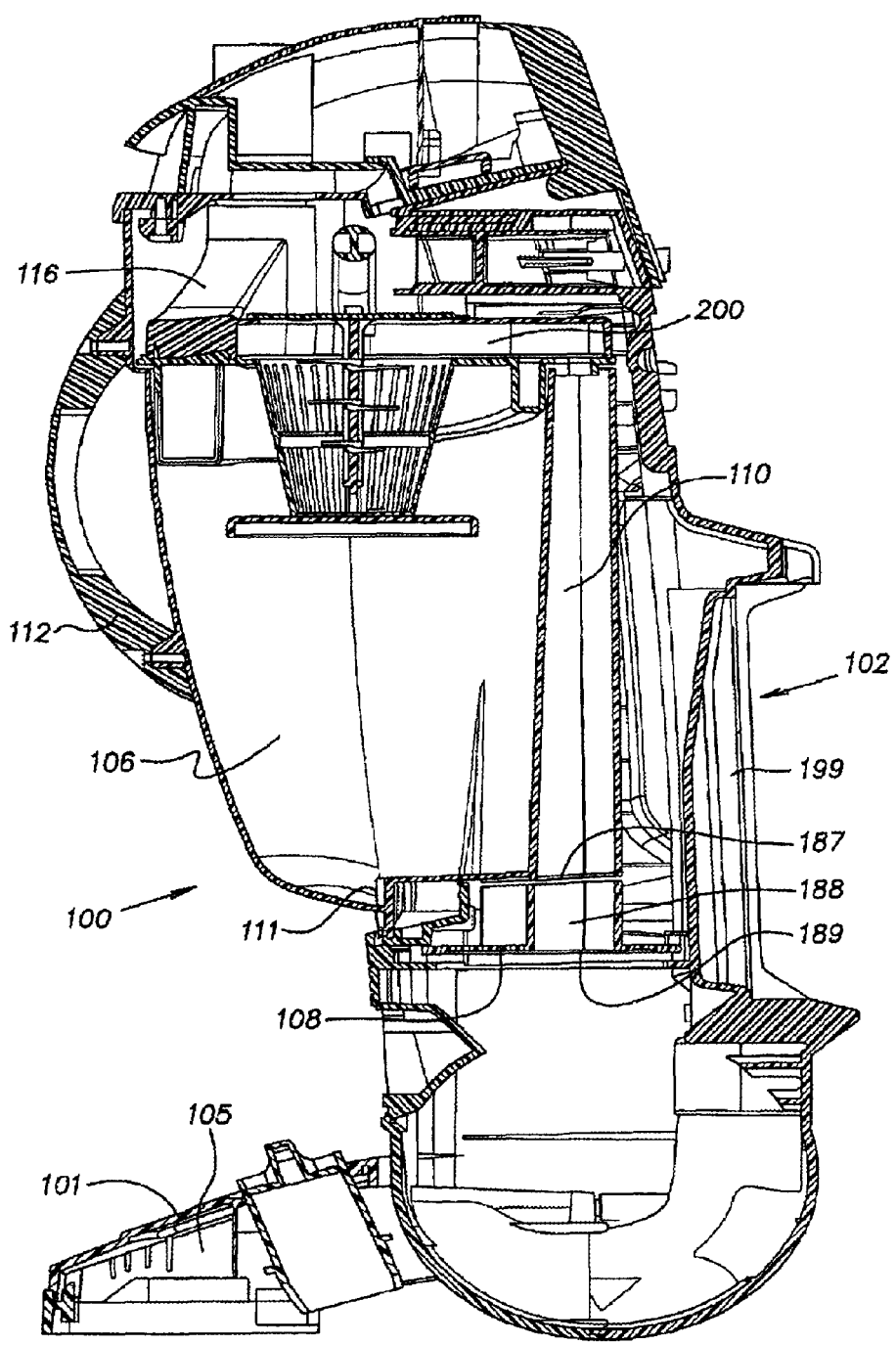

The dustcup assembly according to the present invention is used in all upright vacuum cleaner apparatus 100 having a vacuum cleaner base portion 101, a vacuum cleaner body portion or rear housing 102, and a vacuum cleaner upstanding handle 104 (FIGS. 1a-1b). The base portion 101 includes. a horizontally extending, elongated internal compartment 105 that receives a known rotating brush element (not shown) and cooperates with the body portion 102 to receive a known motor. The motor serves as a drive for the rotating brush and for a known suction fan or impeller. Rotation of the suction fan or impeller creates suction that is selectively communicated to a conventional hose (not shown), which may be operably connected to either the elongated internal compartment 105 containing the rotating brush element or to any of a number of known off-the-floor cleaning tools (not shown).

The body portion 102 is pivotally connected to the base portion 101 and has a rotational axis that is coaxial with the motor axis. The body portion 102 carries a filter/cyclone module, and has an upstanding handle 104 secured thereto.

Figure 2A:
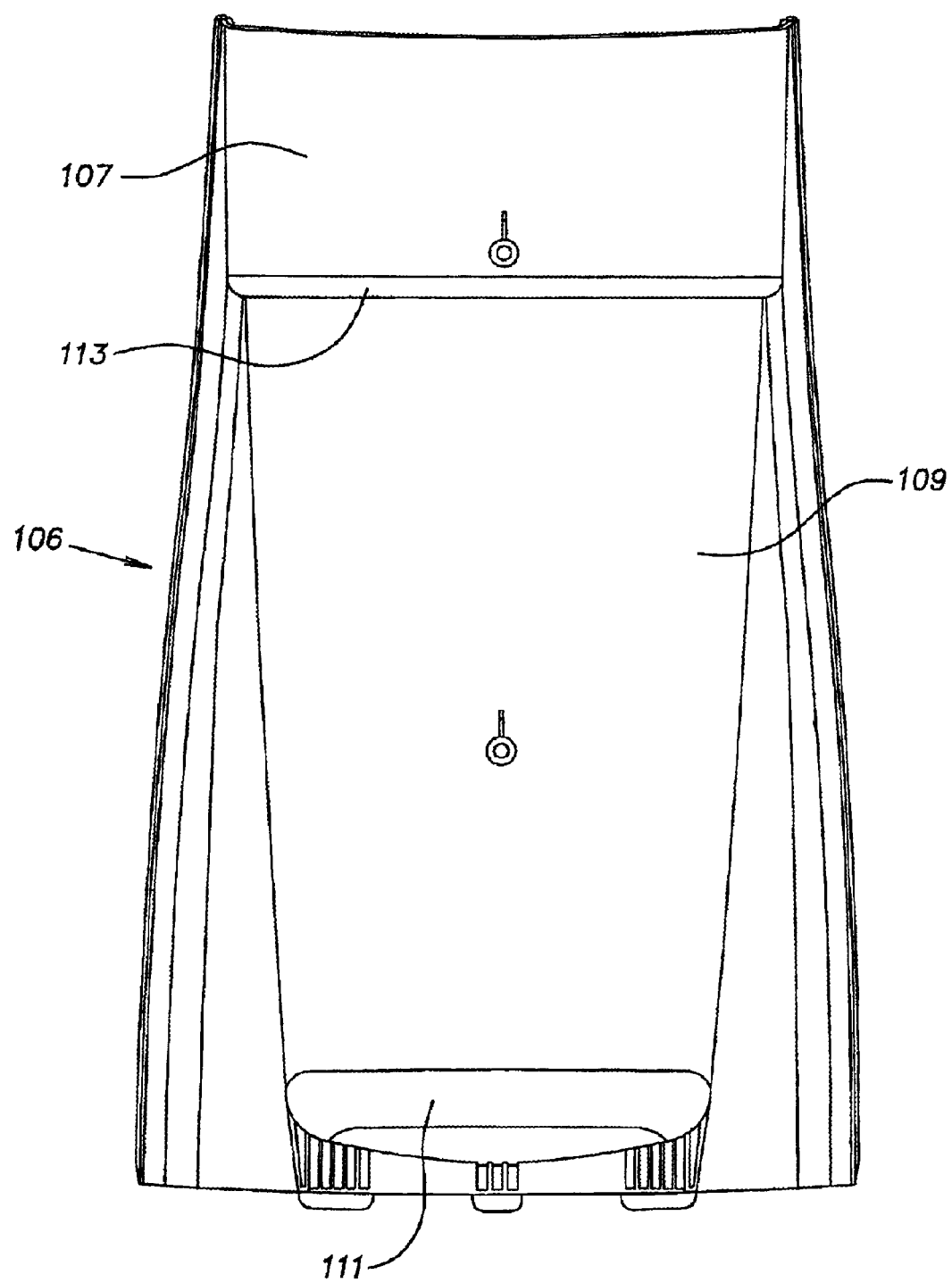
FIG. 2a is a front elevational view of a dustcup of the cleaner.
Figure 2B:
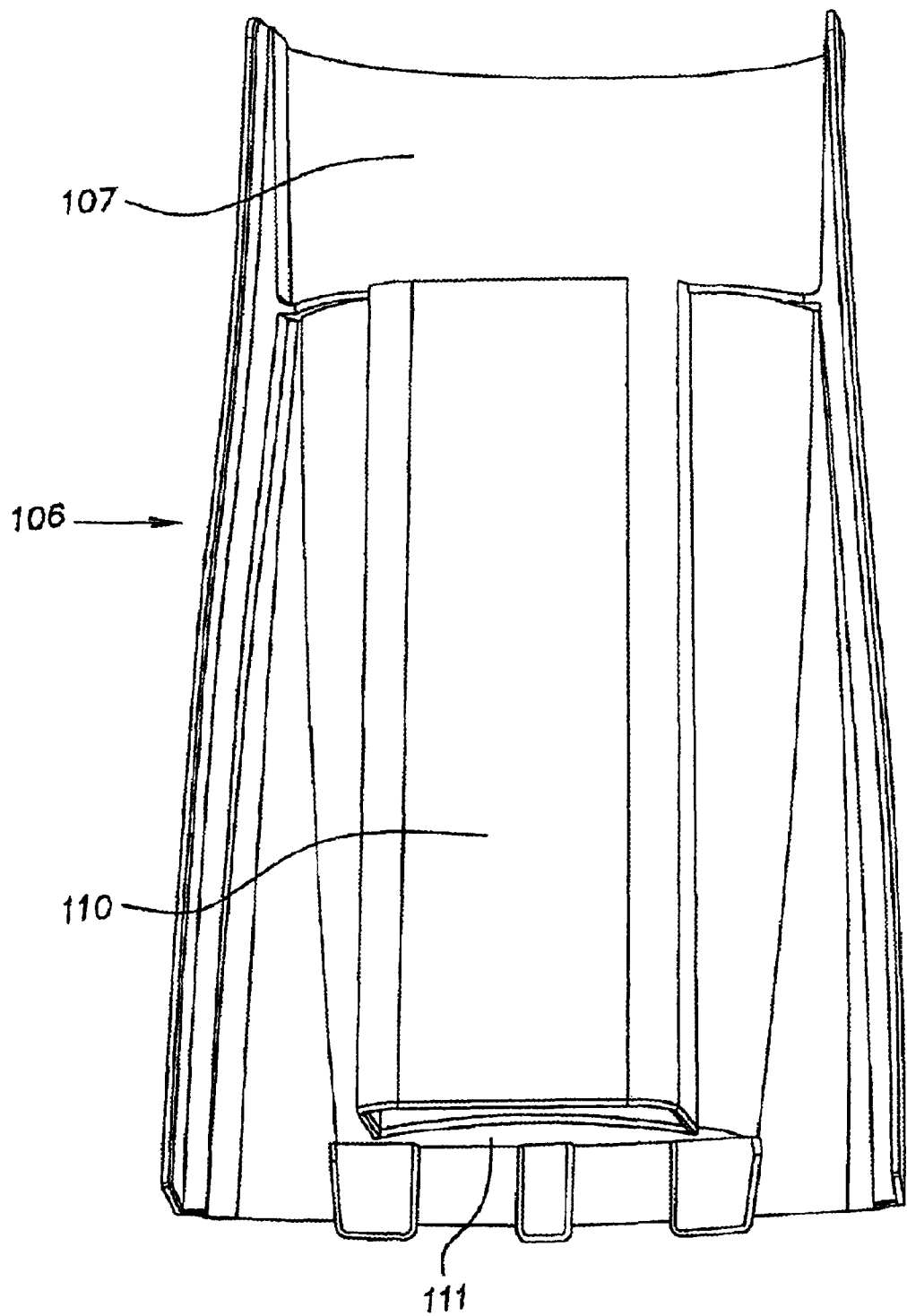
FIG. 2b is a rear and bottom perspective view of the dustcup.
Figure 2C:
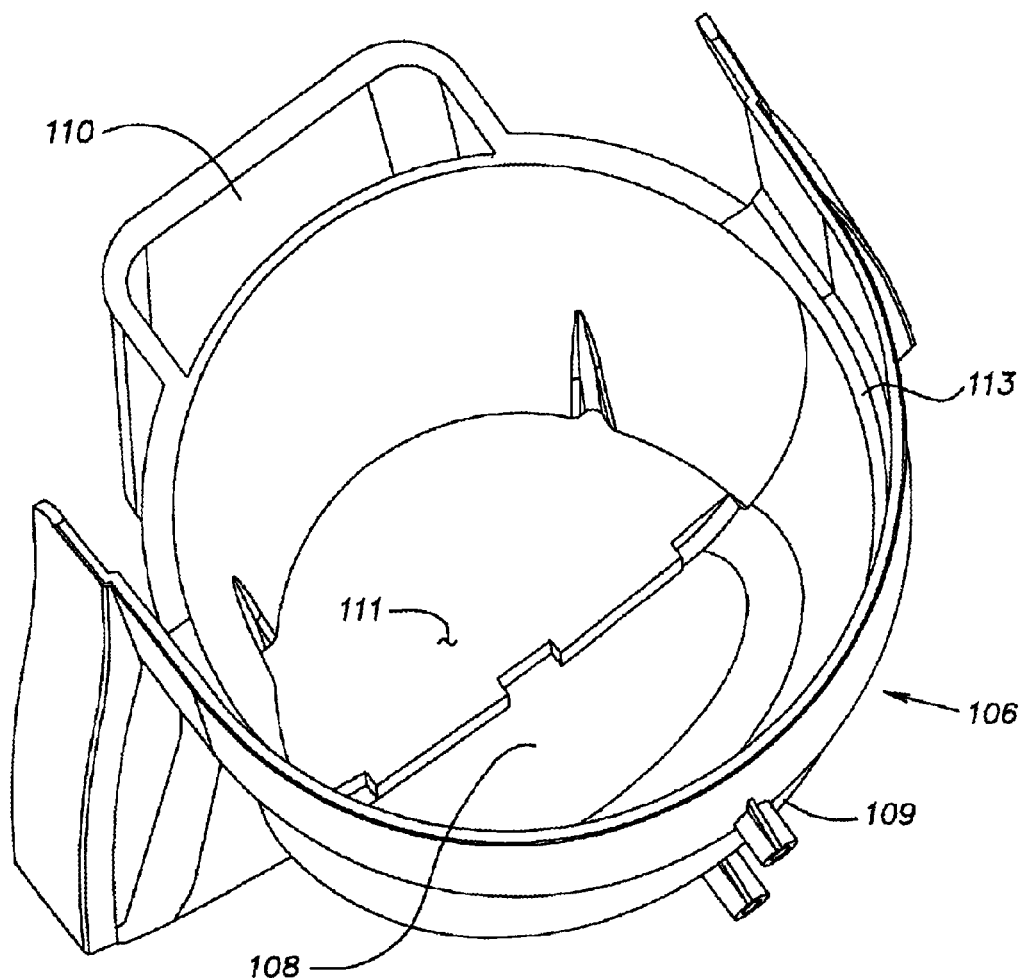
FIG. 2c is a top and front perspective view of the dustcup.

A dustcup 106 (FIGS. 2a-2c) is removably secured to the cleaner body portion 102. The dustcup 106 is a molded plastic part that is preferably at least partially transparent, but may also be translucent or opaque. By having at least a part of the dustcup 106 transparent, the amount of collected dust can be readily seen by the operator and thereby visually indicates when the cup 106 should be emptied.

The dustcup 106 integrally provides and defines a dustcup chamber 108 and a dustcup passageway 110. The dustcup chamber 108 is disposed toward a front side of the dustcup 106 and is open at a top section 107 of the dustcup 106 and closed at all other sections thereof. The dustcup chamber 108 receives and retains a dirt/dust mixture inducted into the vacuum cleaner apparatus 100 either by the rotating brush element or by any of the off-floor cleaning tools, and preferably, the dustcup chamber 108 has at least a transparent front wall 109. Additionally, the dustcup chamber is provided with a step-like barrier 111 at the base thereof. Dirt-laden air flowing spirally downward impinges against the barrier 111 and dirt particles are caused to separate from the air by striking the barrier 111. The filter/cyclone module is received by the top section 107 of the dustcup 106 and communicates with both the dustcup chamber 108 and the dustcup passageway 110.

The dustcup passageway 110 is disposed toward a rear side of the dustcup 106 and defines a path for a stream of clean air to flow from an upper end of the dustcup 106 to a lower end of the dustcup 106. The dustcup passageway 110 serves as a conduit that connects a lower motor inlet (not shown) to an upper plenum chamber 200. In operation, the dustcup passageway 110 communicates suction from the motor/fan to the dustcup 106, as will be apparent from the following description.

A dustcup handle 112 is attached to the front wall 109 of the dustcup 106 and provides a means for an operator of the vacuum cleaner apparatus 100 to easily grasp and hold or transport the dustcup 106 when it is independent of the body portion 102.

The dustcup 106 has a generally round or circular top end region 113 that assists in receiving a cyclonic module. The inventors have found that the circular configuration of the dustcup top end region 113 is superior to other contours. However, it has also been found that the dustcup 106 may deviate from the round configuration as one moves downwardly away from the top end without negatively affecting the dirt-separating performance.

Figure 3A:
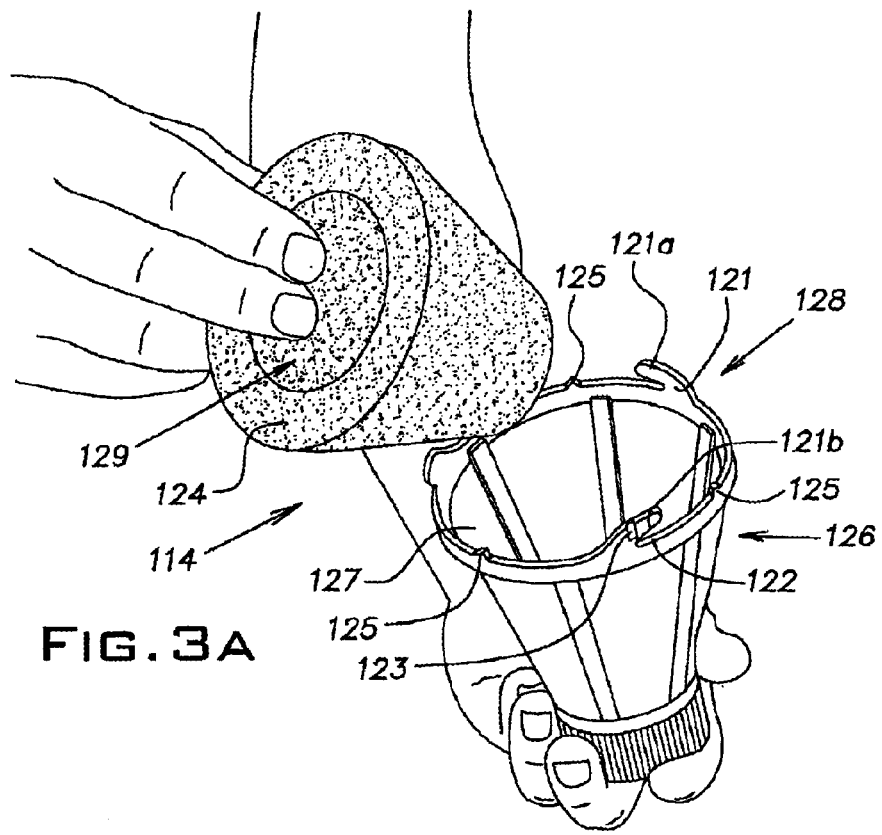
FIG. 3a shows a top perspective view of the filter assembly of the present invention.
Figure 3B:
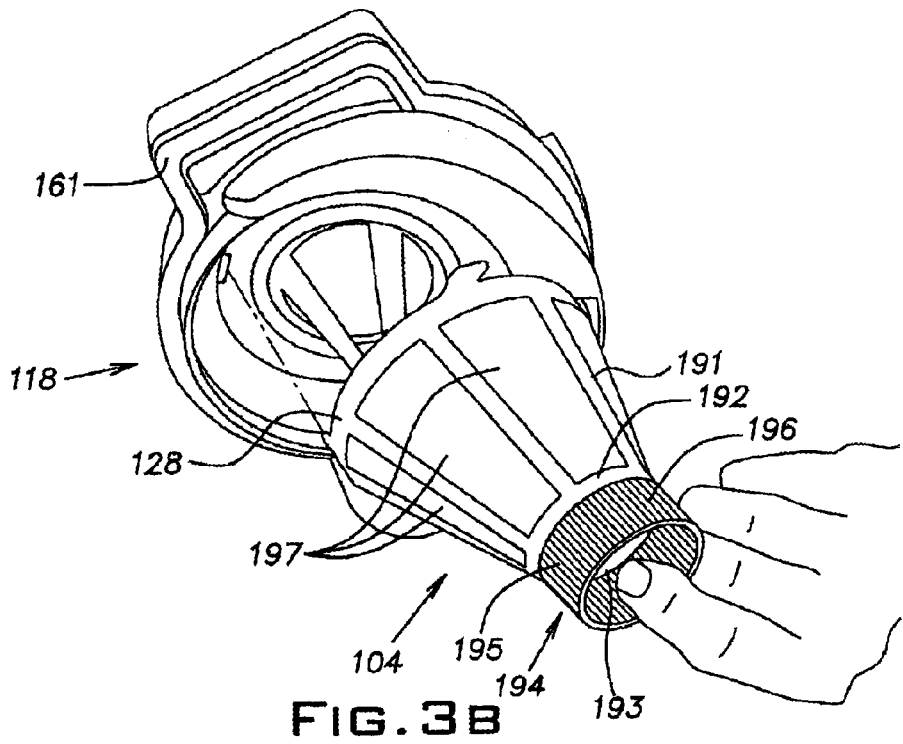
FIG. 3b shows a side and bottom perspective view of the filter assembly and the cyclone module of the present invention.
Figure 4B:
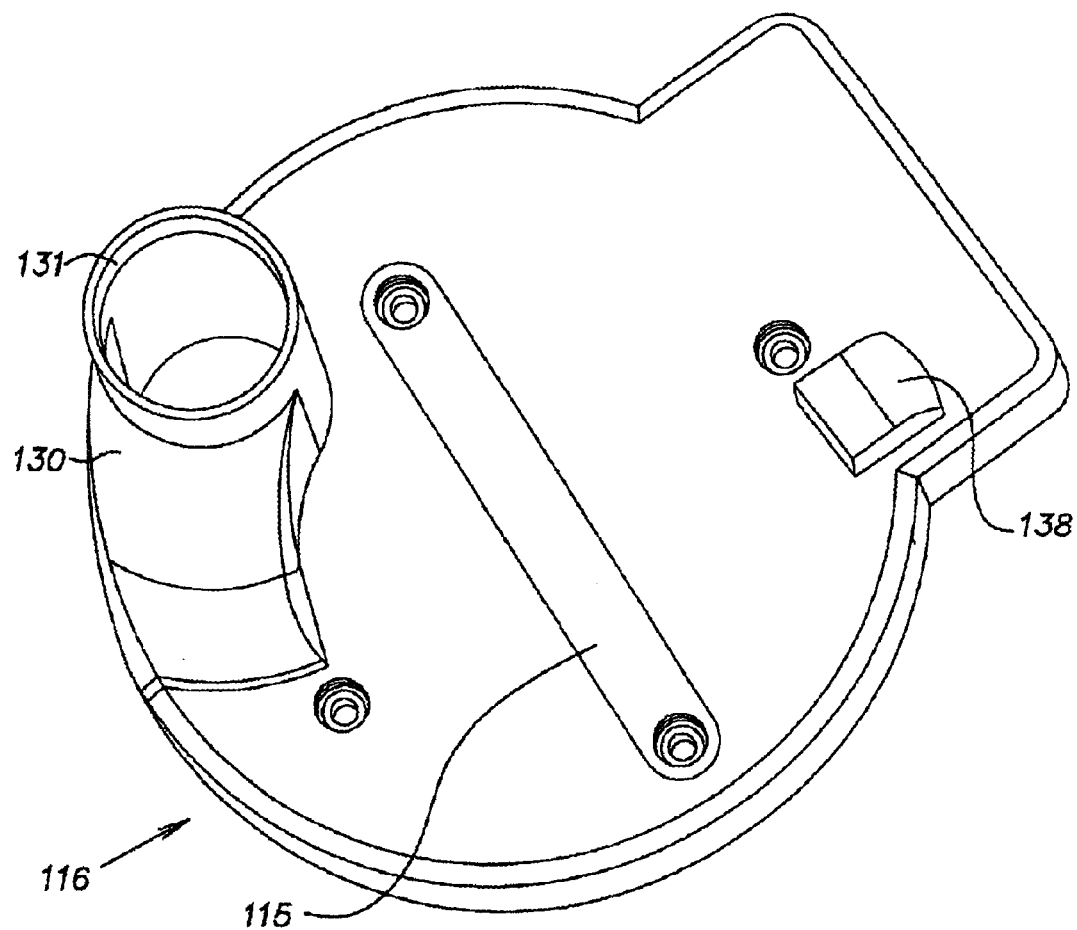
FIG. 4b is a top perspective view of the plenum chamber member.
Figure 4C:
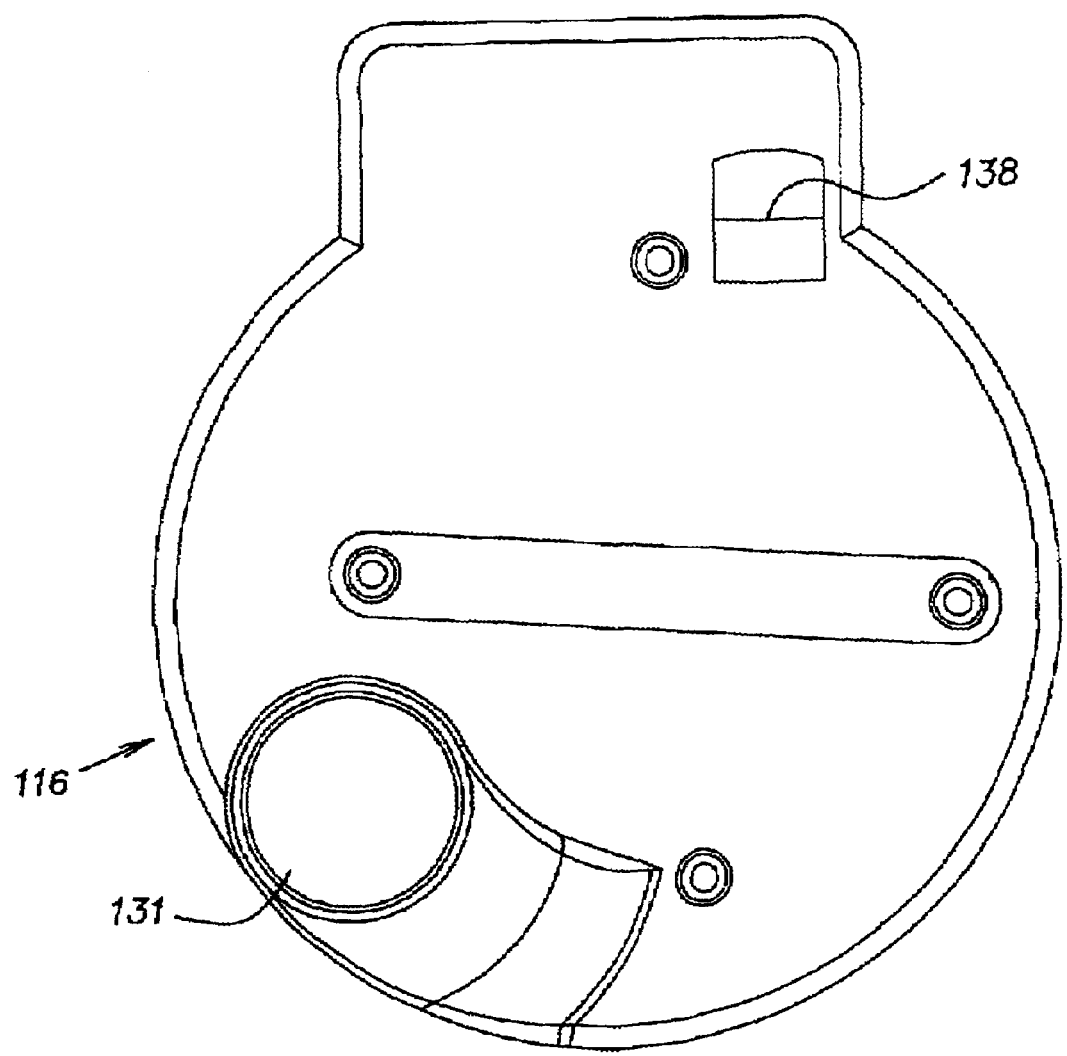
FIG. 4c is a top plan view of the plenum chamber member.
Figure 4D:
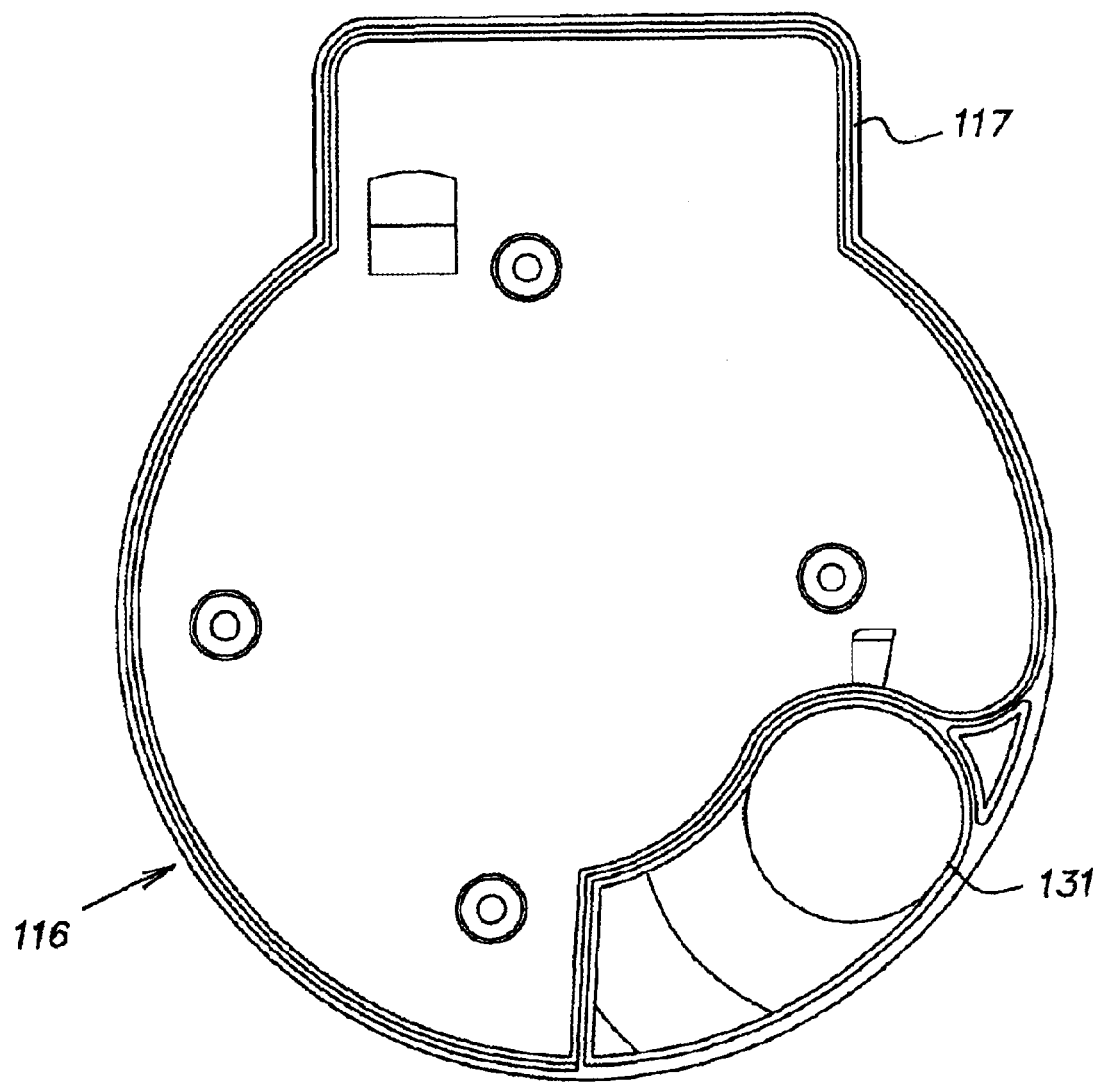
FIG. 4d is a bottom plan view of the plenum chamber member.
Figure 5A:
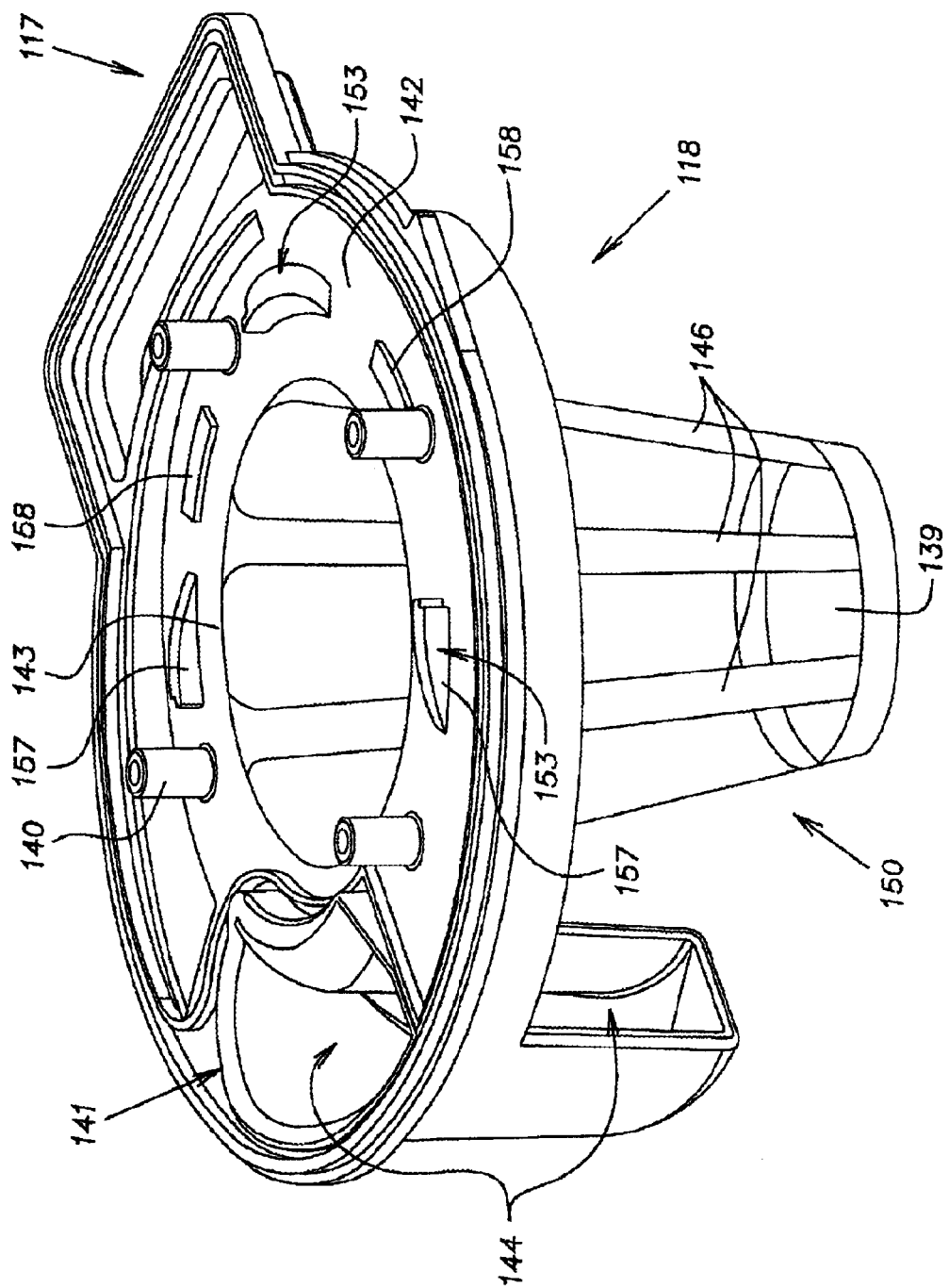
FIG. 5a is a top and side perspective view of a cyclone module.

As will be described hereinafter, the cyclonic module receives a dirt-laden stream of air and separates the dirt from the air. The dirt is retained in the dustcup chamber 108. The dirt-free air is directed to the motor/fan via the dustcup passageway 110. The cyclonic module includes a filter assembly 114 (FIGS. 3*a*-3*b*), a plenum chamber member 116 (FIGS. 4*a*-4*d*), and a cyclone module 118 (FIGS. 5*a*-5*c*).

The filter assembly 114 includes a filter 124 and a cup-like filter receptacle or holder 126. The filter receptacle 126 removably fastens to and extends downwardly from the cyclone module 118 and has a generally frustoconical form.

The filter receptacle 126 is provided with a circular opening 127 defined by its large end 128 and is thus adapted to receive and support the filter 124. The filter 124 is generally cone-shaped, with an open top end 129, and is formed from an open cell flexible foam material. The filter 124 is slidably inserted into the circular opening 127 of the filter receptacle 126. The filter receptacle 126 and associated filter 124 are adapted to be received by the cyclone module 118. The filter receptacle 126 is provided at its large open end 128 with a plurality of mounting hooks 121. The mounting hooks 121 extend upwardly from and are spaced circumferentially about the open end 128. Each of the hooks 121 has a circumferentially directed projection 121*a* that defines a slot-like void 122 between a bottom edge 121*b* of the projection 121*a* and the top edge of the open end 128. Each of the mounting hooks 121 also has on its vertically oriented outside surface a rib-like projection 123. The projection 123, which is situated proximate to the slot-like void 122 defined by each of the hooks 121, extends vertically across the outside surface of each of the mounting hooks 121 and works with the hooks 121 to removably attach the filter assembly 114 to the cyclone module 118 in a manner to be explained in subsequent discussion. In addition to the mounting hooks 121 the filter receptacle 126 is also provided at its large open end with a plurality of bump-like structures 125. The bump-like structures 125 extend a relatively short distance upward from and are spaced circumferentially about the open end 128 and between the mounting hooks 121. When the filter assembly 114 is attached to the cyclone module 118, the bump-like structures 125 engage the cyclone module 118 in a manner that will also be subsequently described.

The filter receptacle 126 is further comprised of a plurality of elongated, rib-like appendages 191 that extend downwardly from the large open end 128 of the receptacle 126. Each of the rib-like appendages 191 is angled inwardly relative to the open end 128 and connect at their lower end to an annular collar 192 that is integrally joined to the periphery of a flat, circular top portion 193 of a cylindrical lower portion 194 of the filter receptacle 126. The cylindrical lower portion 194 is provided with a series ribs of 195. The ribs 195, which are molded into the outer surface of the cylindrical lower portion 194, extend vertically along the outer surface and are separated from one another in the circumferential direction so as to define a series of depressions 196 between the ribs 195. The ribs 195 and the depressions 196 cooperate to create a gripping surface that can be grasped by a user of the vacuum cleaner apparatus 100 and to impart rotational movement to the receptacle 126 for purposes to be subsequently described.

The filter receptacle 126 is further provided with a porous screen element 197. The screen element 197, which is preferably fabricated from interwoven nylon filaments, engages the periphery of the large open end 128, the rib-like appendages 191 and the annular collar 192 so as to form a permeable barrier between the filter 124 and the air-dirt mixture that swirls about the interior of the dirtcup chamber 108. The screen element 197 serves to prevent relatively large dirt particles from contacting and adhering to the filter 124.

The cyclone module 118 (FIGS. 5*a*-5*c*) is disposed beneath the plenum chamber member 116 and is secured to the plenum chamber member 116 via a plurality of upstanding screw-receiving bosses 140. The plenum-chamber member 116 cooperates with the cyclone module 118 to define a peripheral labyrinth or tongue and groove sealing interlock 117 between a lower edge 119 of the plenum chamber member 116 and an upper surface edge 120 of the cyclone module 118. This provides a means for positive positioning or registration between these elements of the assembly and air-tight sealing without the need for additional gaskets. The plenum chamber member 116 is further provided with a handle 115 that is removably fastened to the top of the plenum chamber member by known fastening means such as screws (not shown) that are received by the screw-receiving bosses 140 provided in the cyclone module 118.

The cyclone module 118 includes an upper wall 142 that has a peripheral opening 141 that communicates with a peripheral volute passage 144 of a volute structure 145, and a downwardly-flanged central opening 143 around which a plurality of relatively flat, elongated appendages 146 downwardly extend. The elongated appendages 146 angle inwardly relative to the central opening 143 and they are connected at their lower ends to a disk-like portion 139. The appendages 146 and the disk-like portion 139 define a frustoconical, cage-like structure 150. The cage-like structure 150 is dimensionally configured like the inside surface of the filter 124 and is thus made capable of receiving the filter 124. The structure 150 acts both as a support for the filter 124 and as a means to prevent it from inwardly distorting or collapsing due to negative pressure when the vacuum cleaner apparatus 100 is in operation.

The wall 142 of the cyclone chamber 118 is provided with a first plurality of arcuate raised structures 153. The structures 153 are arranged about the central opening 143 in a circular pattern and they define a first plurality of relatively deep inverted channels 154 that have openings 155 on the bottom surface 147 of the upper wall 142 and that further have openings 156 on the vertically extending sides 157 of the channels 154.

Additionally, the upper wall 142 of the cyclone chamber 118 is provided with a second plurality of arcuate raised structures 158. The structures 158 are arranged about the central opening 143 and located between the structures 153 so that the raised structures 158 lie on the same circle that passes through the raised structures 153. The raised structures 158 define a second plurality of inverted channels 159 that are shallow relative to the inverted channels 154 and that have openings 160 on the bottom surface 147 of the cyclone module 118. Also on the bottom surface 147, a pair of rib-like projections 162 and 164 are provided. The projection 162 forms a circular arc and lies just radially outside of the inverted channels 154 and 159. The projection 164 forms a continuous circle and is positioned radially between the central opening 143 and the inverted channels 154 and 159. Both of the rib like projections 162 and 164 extend a short distance vertically downward from the bottom surface 147; however, the rib-like projection 162 extends farther downwardly than the rib-like projection 164.

The first plurality of inverted channels 154 and the second plurality of channels 159 are also situated on the wall 142 of the cyclone module 118 so that the bottom openings 155 receive the mounting hooks 121 of the filter receptacle 126 and so that the openings 160 receive the bump-like structures 125 also of the filter receptacle 126. Once the mounting hooks 121 and the bump-like structures 125 are so received by the bottom openings 155 and 160, they are caused to rotatably move within the channels 154 and 159 so that, in the case of the mounting hooks 121, the circumferentially directed projections 121a and the rib like projections 123 are received by the side openings 156 of the channels 154 to secure the filter receptacle 126 to cyclone module 118 and so that, in the case of the bump-like structures 125, the structures 125 cause the top 129 of the filter 124, which projects a short distance vertically above the top of the filter receptacle 126, to become compressed against the circular rib-like projection 164 and the portions of the bottom surface 147 of the cyclone module 118, lying radially inward and outward of the projection 164. The hooks 121 and the bump-like structures 125 are caused to rotatably move in the above described fashion when the user of the vacuum cleaner apparatus 100 grasps the downwardly extending portion of the filter receptacle 126 and twists the receptacle 126 in a clockwise direction relative to the bottom surface 147 of the wall 142 of the cyclone module 118. When the receptacle 126 is so twisted, the bottom edge 121b of the projection 121a engages the top surface of the upper wall 142 and the rib-like projection 123 engages an outer edge of the opening 156 of the inverted channel 154 to resist rotational movement of the receptacle 126 until such time as the operator desires to remove the receptacle 126 and the filter 125 from the module 118. It should also be noted that, when the projections 121a and the ribs 123 engage the inverted channels 154 and the wall 142 in the above described manner, a portion of the outside surface of the top of the receptacle 126 rests just inside of the projection 164 an thus provides an outer seal for the filter 124.

The inlet passageway or chimney 130 of the plenum chamber member 116 vertically aligns with the peripheral volute opening 141 of the cyclone module 118 and serves to introduce dirt-laden air tangentially into the top of the chamber 108 of the dustcup 106 via the cyclone module 118. The volute structure 145 extends downwardly from the upper wall 142 and defines the passage 144 that extends spirally downward from the upper wall 142.

Finally, a resilient gasket element 161 is mounted on the lower surface 143 of the flange that forms the perimeter of the cyclone module. The gasket 161 provides the seal between the cyclone module 118 and the top surface of the dustcup 106.

When the plenum chamber member 116 and the cyclone module 118 are properly assembled an air space or chamber 200 is provided between the top wall 147 of the cyclone module 118 and the bottom surface of the plenum chamber member 116. This air space 200 is required in order to allow airflow to communicate between the suction fan and the dustcup intake port.

To complete the adaptation of the dustcup assembly in this retro-fit application there is a need for components that will accept the dustcup 106 into the existing housing 102 with minimal impact to existing configuration and will enhance operator interface. Additionally, in order to maintain the minimum size of the shipping carton, the upstanding handle 104 is packaged detached from the vacuum body 102. The upstanding handle 104 includes a peripheral handle rib 165 at the lower portion thereof. The handle rib 165 locates and retains the components that will ultimately interact with the dustcup 106.

Figure 6:
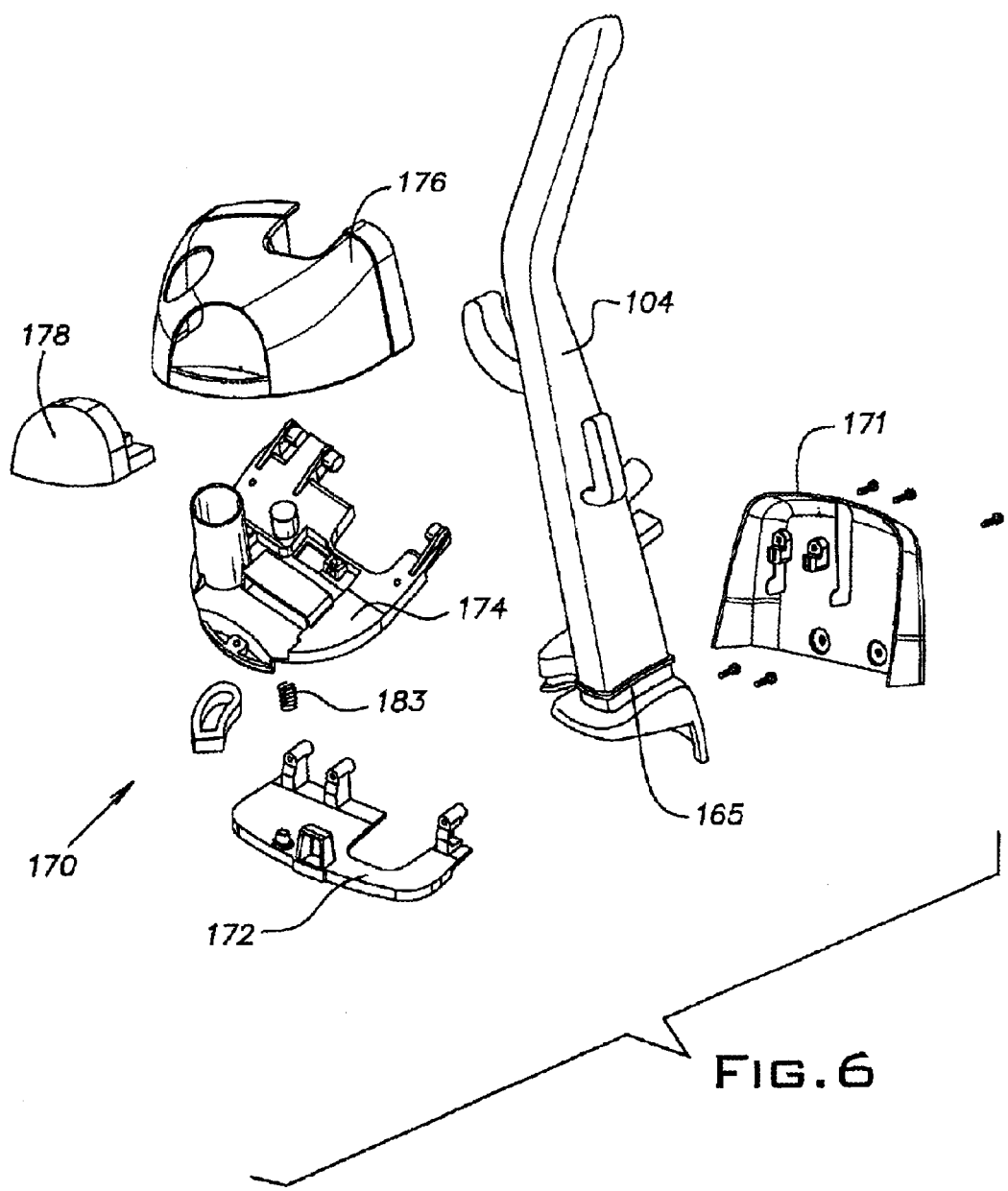
FIG. 6 is an exploded perspective view of the assembly at the lower end of the handle.
Figure 7A:
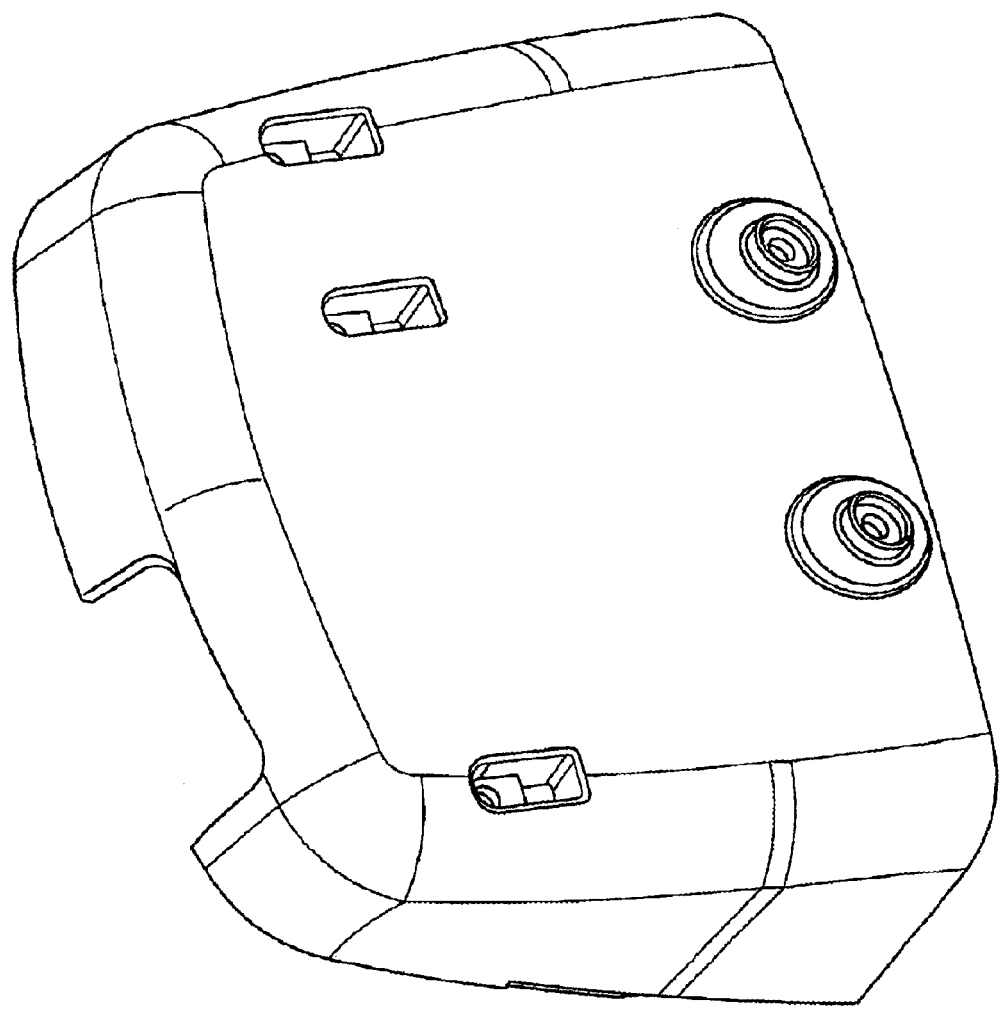
FIG. 7a is a rear perspective view of a rear handle bracket.
Figure 7B:
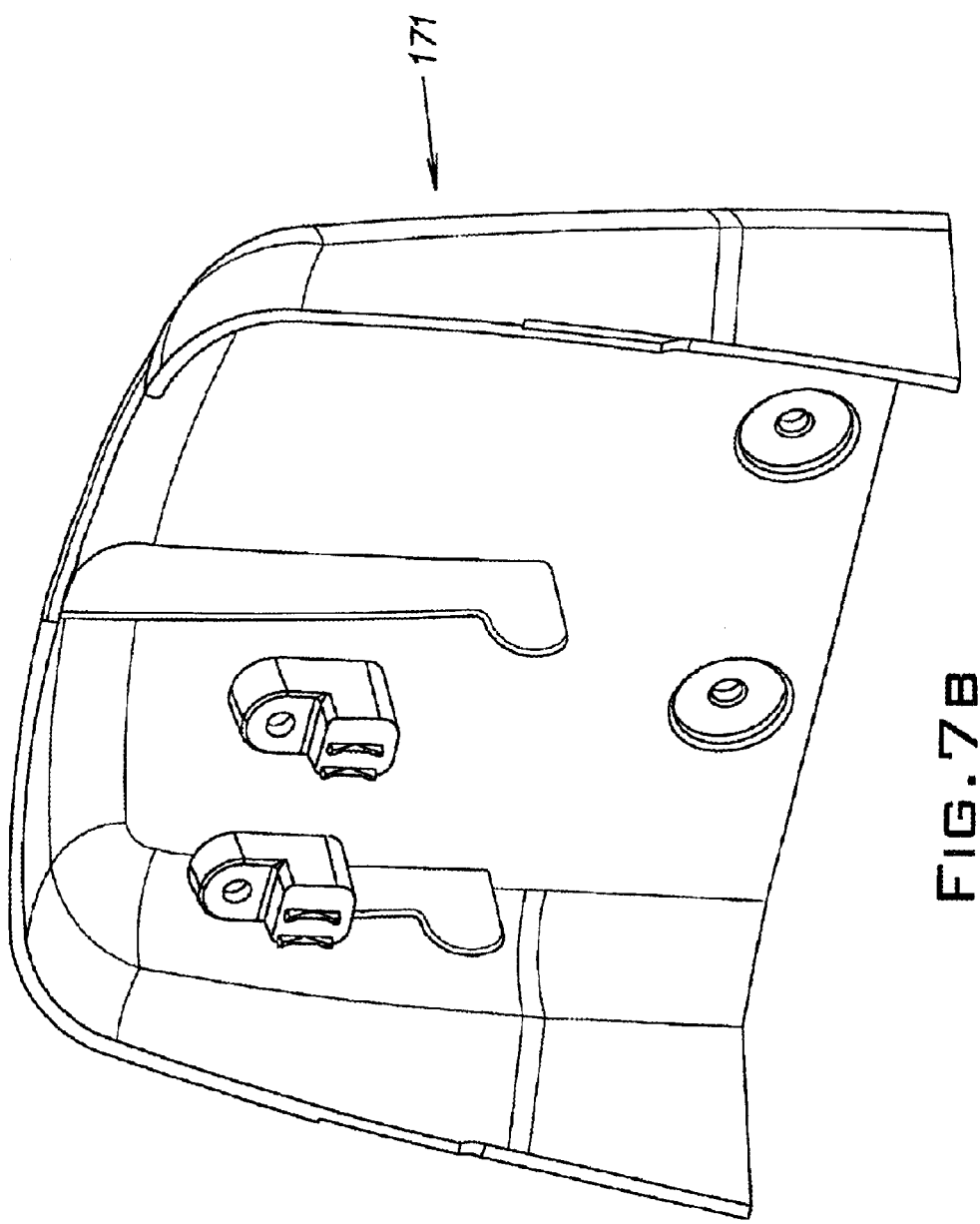
FIG. 7b is a front perspective view of the rear handle bracket.
Figure 8A:
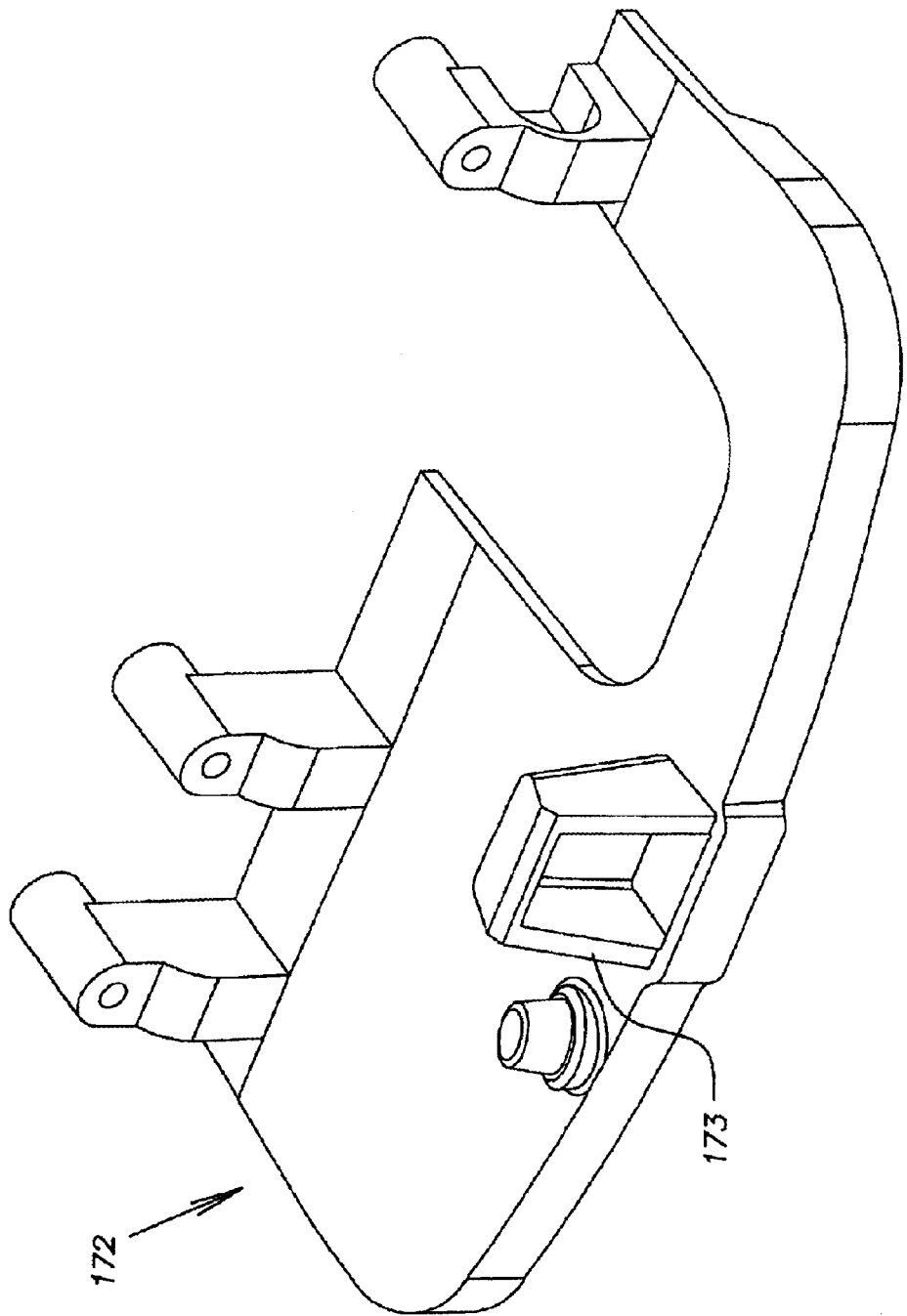
FIG. 8a is a top and front perspective view of the front bracket.
Figure 8B:
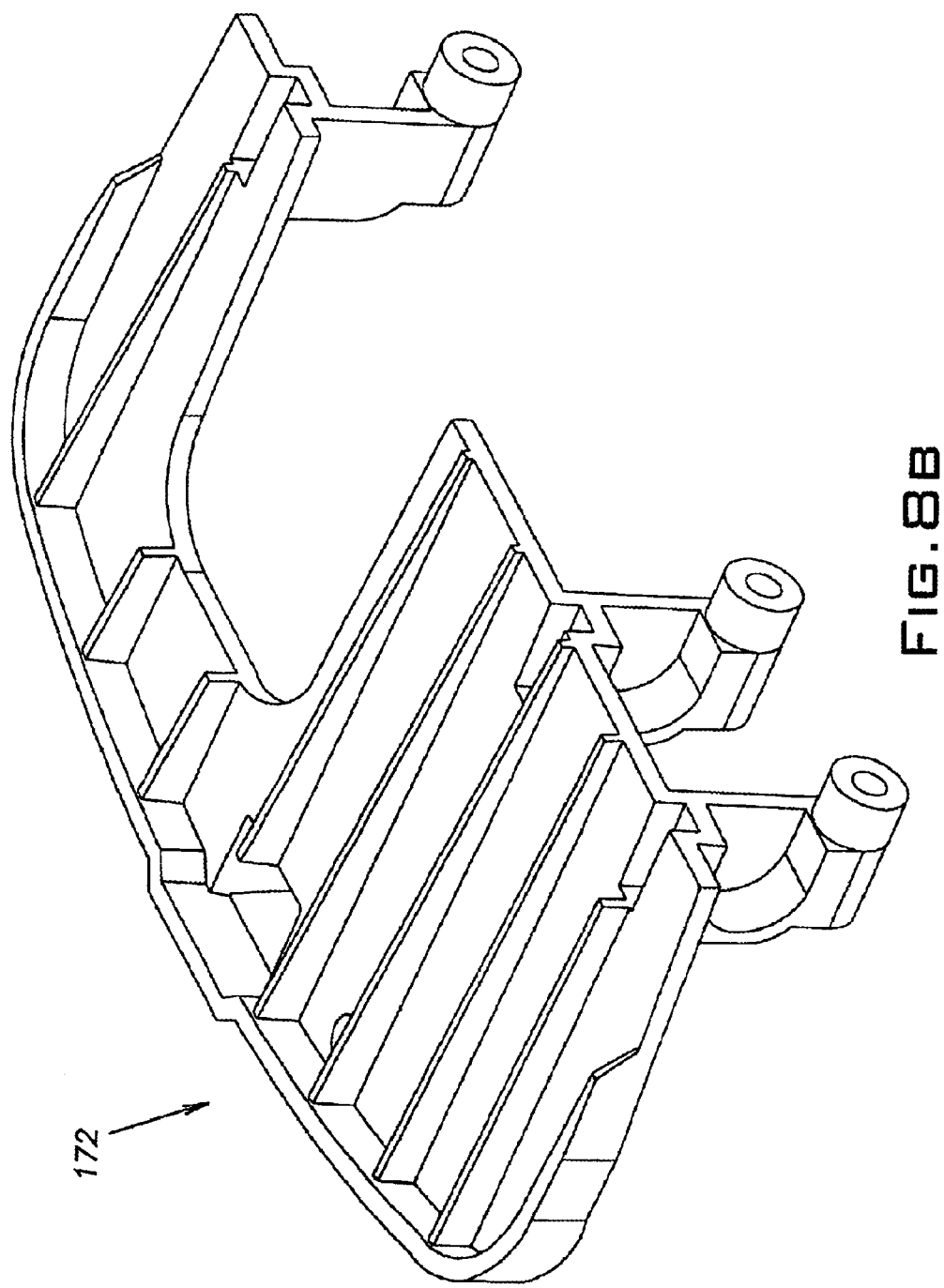
FIG. 8b is a bottom and rear perspective view of the front bracket.
Figure 9A:
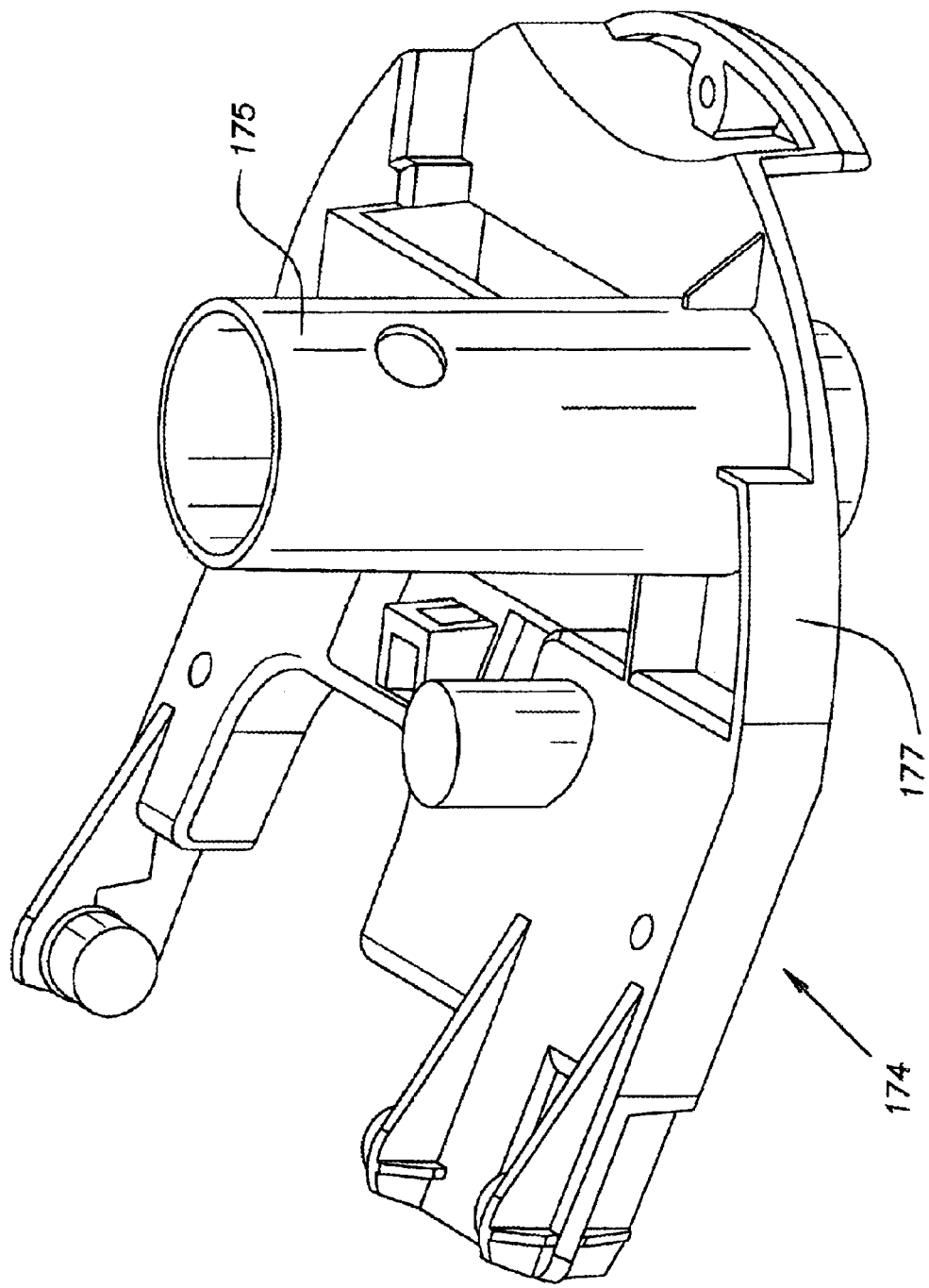
FIG. 9a is a top perspective view of a top-hinged support.
Figure 9B:
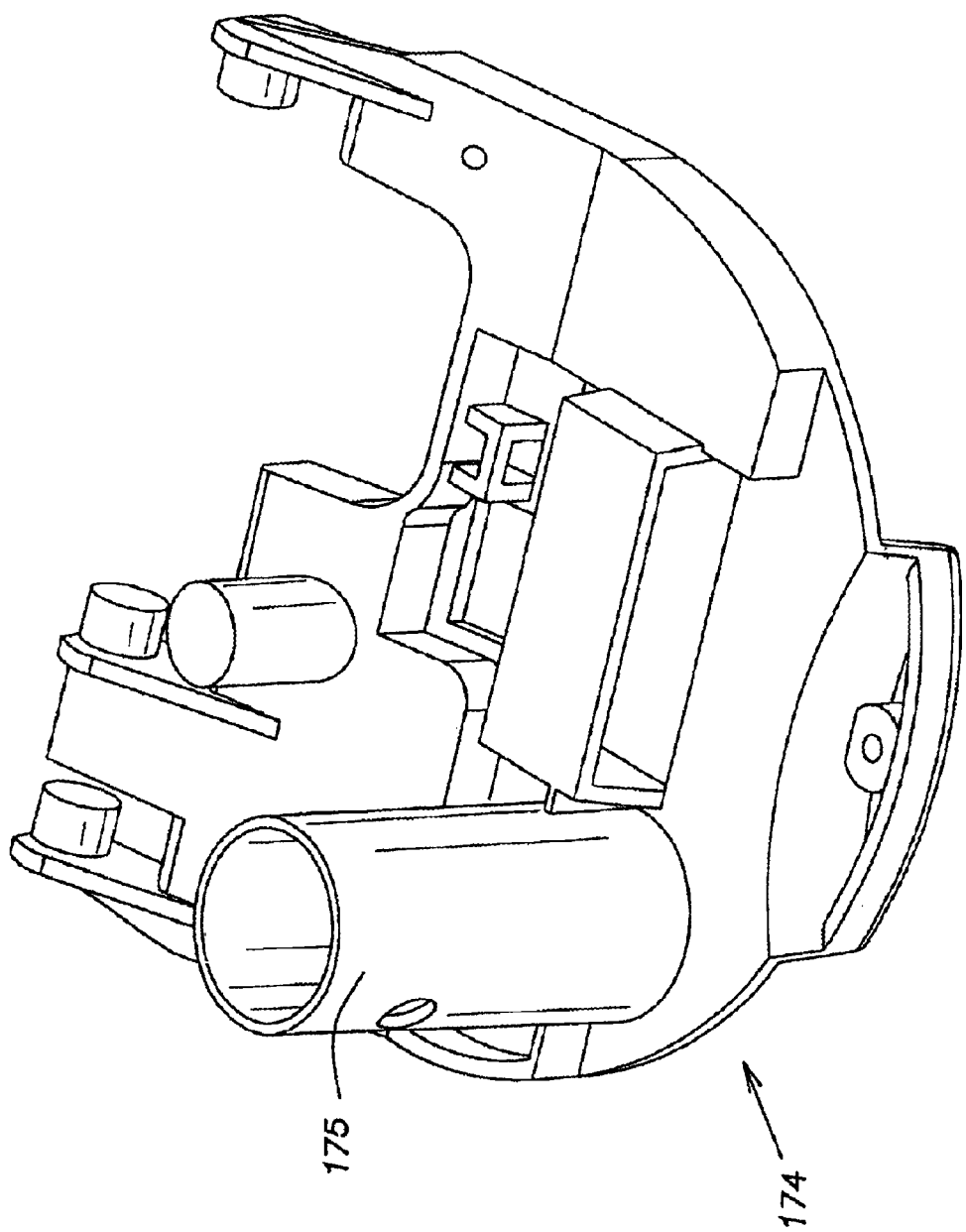
FIG. 9b is a top perspective view of the top-hinged support.
Figure 9C:
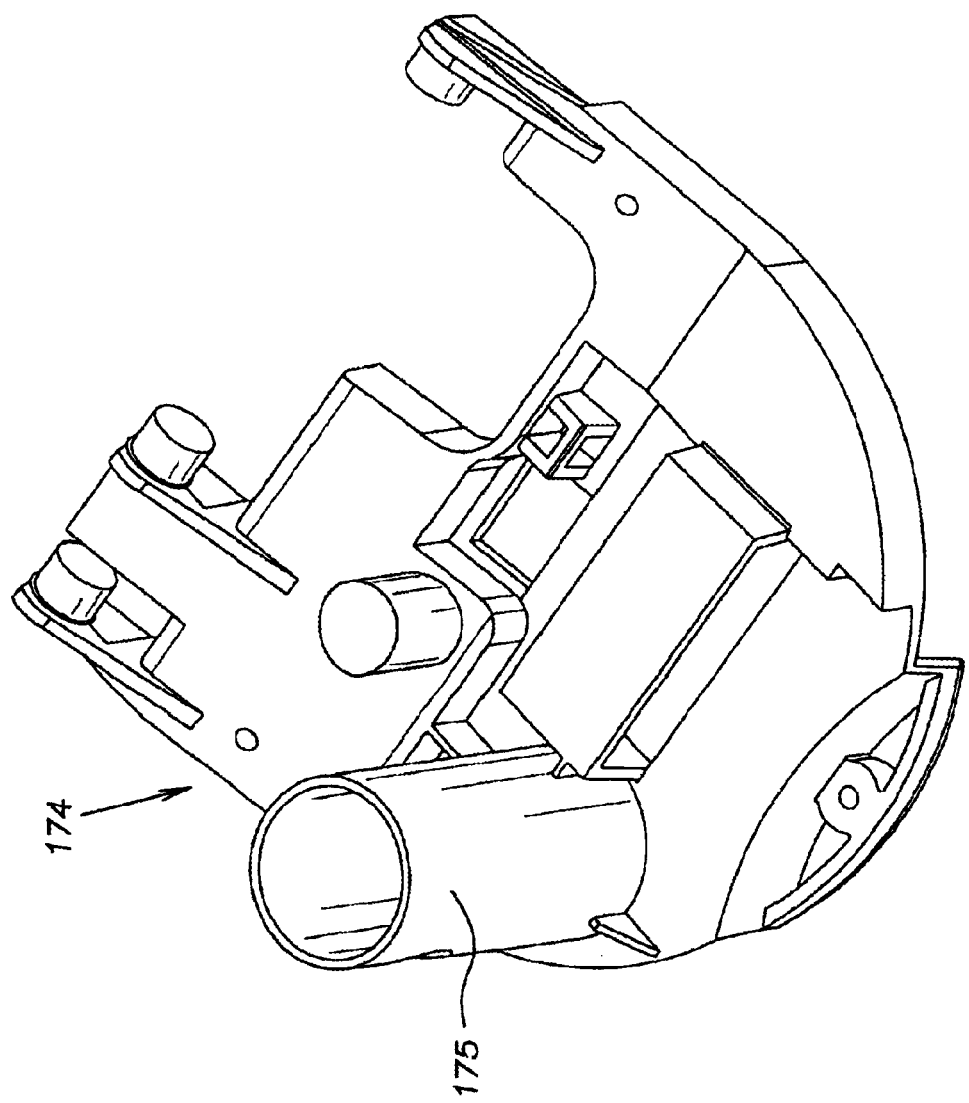
FIG. 9c is a top perspective view of the top-hinged support.
Figure 11:
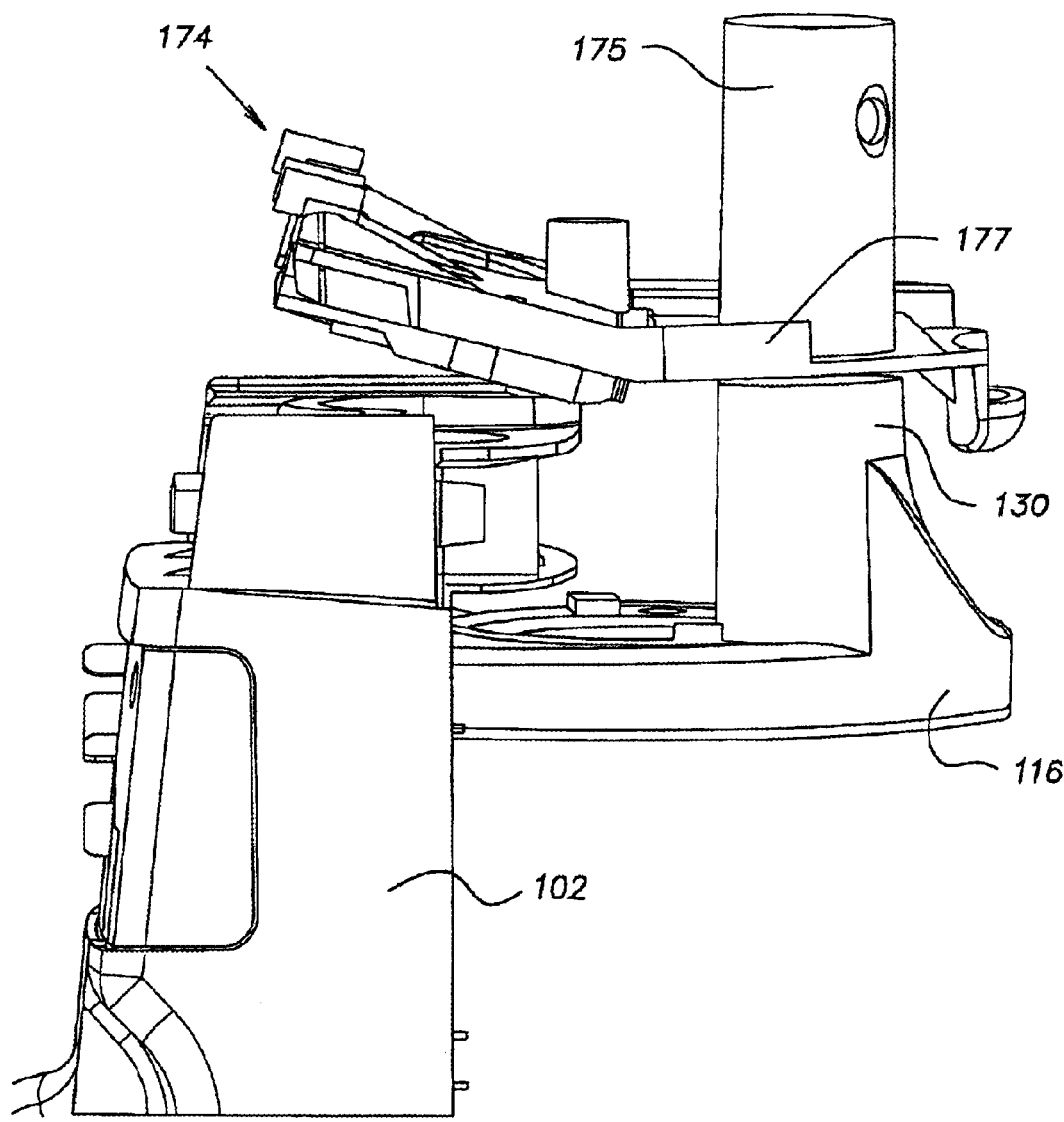
FIG. 11 is a view of the plenum chamber member and the top-hinged support connected together, with other portions of the assembly removed.
Figure 13:
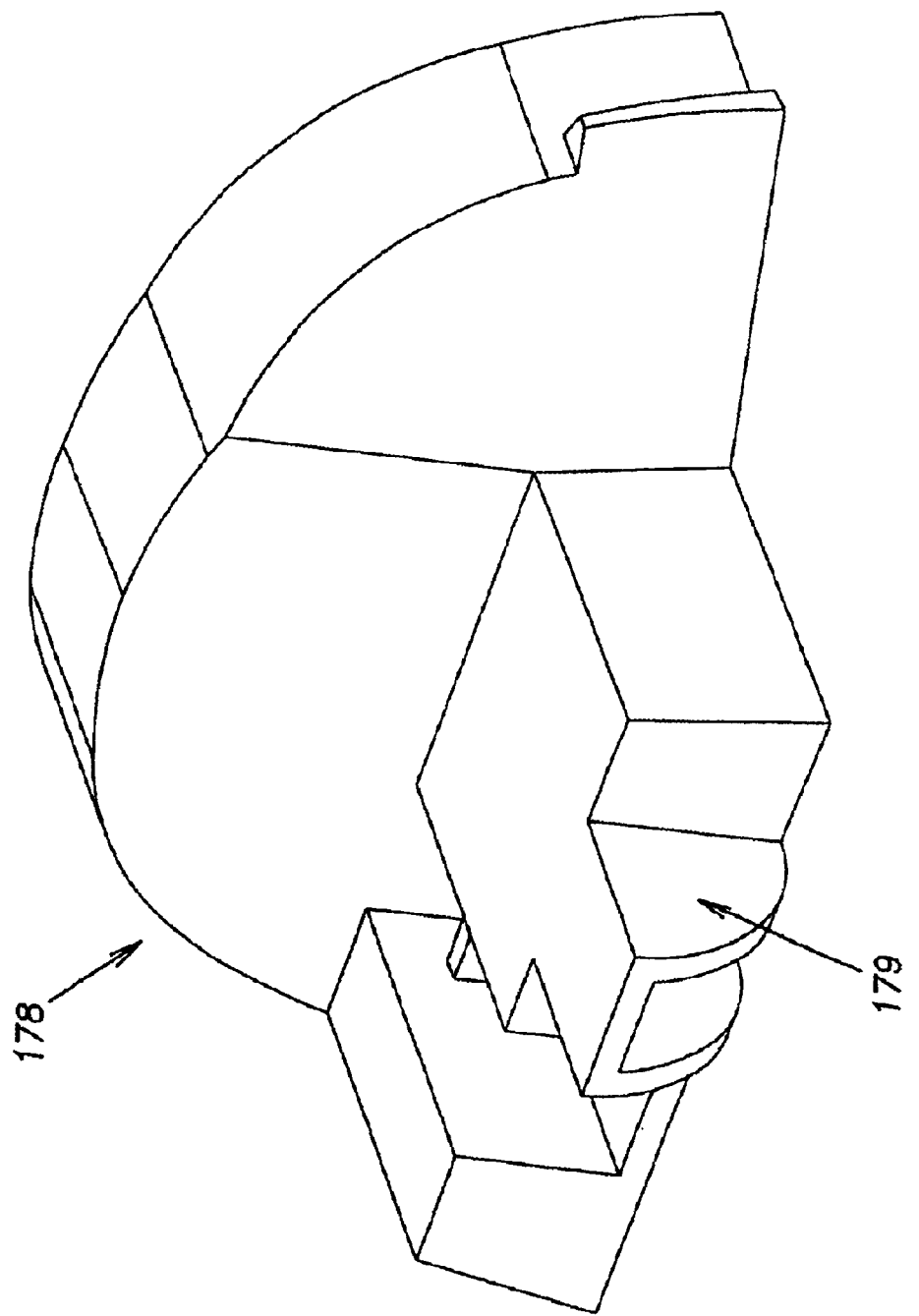
FIG. 13 is a perspective view of the latch.

The lower handle assembly 170 (FIG. 6) includes a rear handle bracket 171 (FIGS. 7a-7b), a front handle bracket 172 (FIGS. 8a-8b), a top-hinged support 174 (FIGS. 9a-9c), and a top cover 176 (FIG. 10). These components, in conjunction with a latch 178 (FIG. 13) and various conventional springs and gaskets, define the assembly 170 that is permanently attached at the base of the upstanding handle 104. When the upstanding handle 104 is mounted to the top of the rear housing 102 by the operator, the above listed parts of the assembly 170 work in concert with the dustcup 106, as will be apparent from the following.

Figure 12A:
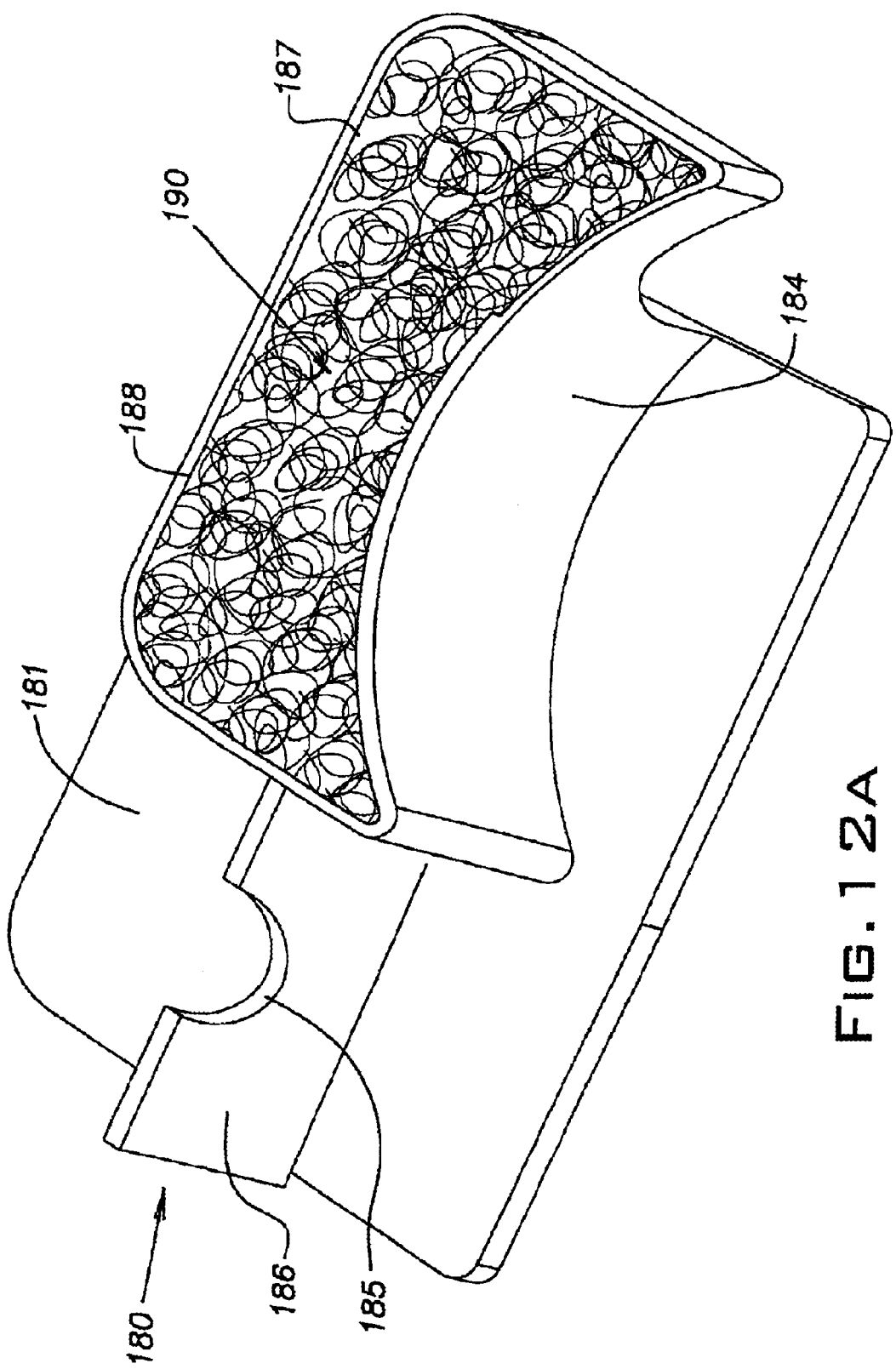
FIG. 12a is a top perspective view of the motor intake adaptor.
Figure 12B:
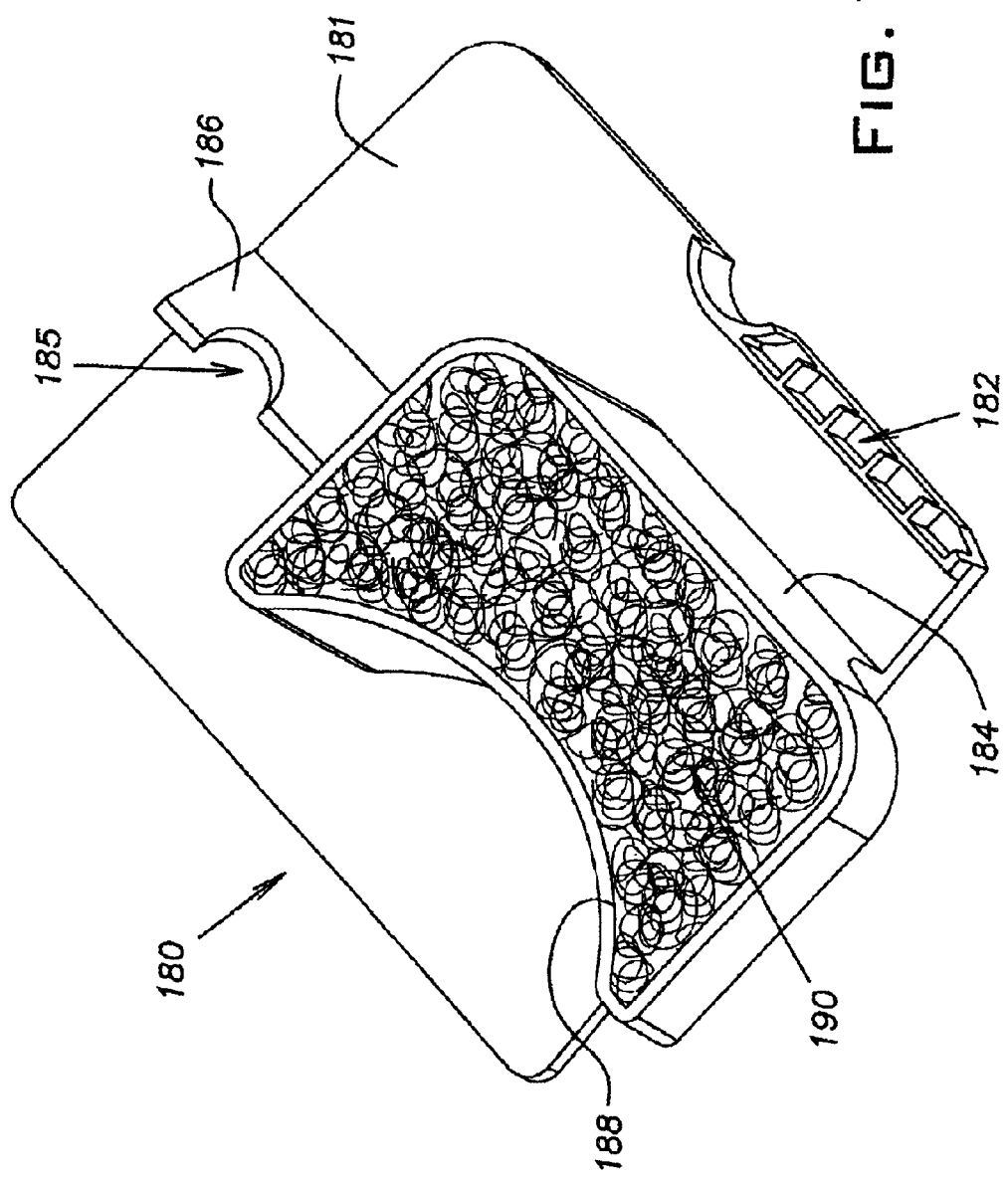
FIG. 12b is a bottom perspective view of the motor intake adaptor.

To complete the adaptation of the dustcup 106 to the existing upright rear housing 102 it is necessary to provide means for getting airflow from the suction fan into the dustcup passageway 110 that is located at the rear of the dustcup 106. A motor intake adapter 180 (FIGS. 12a-12b) provides a transition between the dustcup passageway 110 and the suction fan. The adaptor 180 is a molded plastic structure having a flat, generally rectangular base portion 181, a walled structure 184 extending upwardly from the base portion 181, a thin, vane-like structure 186 extending upwardly from the base portion 181 and outwardly from a side of the walled structure 184, and a mounting flange 182. The walled structure 184 defines a passageway 188 having a top opening 187 and a bottom opening 189 that is situated in the base portion 182 of the adaptor 180. The passageway is preferably provided with an open cell foam filter 190 that serves as a final means to catch any dirt particles before the air stream enters the suction motor. The vane-like structure 186 is provided with a semicircular aperture 185. When installed in the vacuum cleaner apparatus 100, the bottom side of the base portion 181 and the opening 189 of the passageway 188 are situated at the opening of the intake of the suction motor, the vane-like structure 186 engages an already existing post-like projection within the rear housing 102, and the mounting flange 182 is captured by a preexisting rib structure inside the rear housing 102 and the motor cover. When the motor cover is attached to the rear housing 102, the flange 182 of the adapter 180 is trapped between the suction motor intake and the preexisting rib structure of the housing 102 and a seal is created between the face of the motor intake and the motor intake adapter 180. A molded gasket (not shown) is positioned on the top perimeter surface of a walled structure 184 and acts as the resilient seal that is compressed by the lower flange of the dustcup passageway 110 when the dustcup 106 is pivoted into its working position partially recessed inside the rear housing 102.

In operation, with dustcup assembly installed, motor intake to suction fan is in fluid communication with a suction nozzle (not shown). Negative pressure is generated by the suction fan and pulls air through the system. Dirt mixed with air enters the nozzle, travels through the hose and continues through the hose connector. The hose connector is mounted to a chimney extension 175 on the tophinged support 174. Air flows through the inlet 131 on the plenum chamber and into the top of the cyclone module intake port 143 and is caused to bend 90 degrees by the volute 145 and internal rib construction.

Air exits the cyclone inlet and enters the top of circular portion of the chamber 108 of the dustcup 106 in a path tangential to the inner wall. After traveling about halfway around the inside circumference of the dustcup chamber 108, the air/dirt mixture encounters the helical downward-ramped spiral 149 of the base of the cyclone intake. As the air/dirt mixture encounters the spiral 149, the mixture is encouraged to travel axially downward while still maintaining the centrifugal forces of high speed rotation that effectively separates the large particle matter from the air flow. Air passing the open end of the spiral acts as a siphon to help pull incoming air even more quickly into the interior of the dustcup chamber 108. The greater that the velocity is of the air entering the dustcup chamber 108, the greater is the efficiency of the system.

By introducing this ramped helical profile 149 to the interior contour, dirt is biased away from, the filter assembly 114, providing less dwell time for the air/dust mixture to be in proximity to the filter assembly 114. As the air/dust mixture is forced into a rapid circular motion, centrifugal forces act upon the more dense dust particles, pressing them against the inside walls of the dustcup chamber 108 and away from the filter assembly 114. This reduces the effects of negative air-pressure that might otherwise cause dust to go directly into the filter 124 instead of precipitating to the base of the dustcup chamber 108. The distinct advantage of locating the filter 124 in the top area of the dustcup chamber 108 is to keep it out of the accumulation of dust and debris that gather in the dustcup 106 and to maintain unimpeded air flow until the cup 106 is filled with dirt. There is less chance that dirt will collect around the filter element 124 and allows easier debris removal from the filter surface when servicing by the operator. After dirt and air enter the dustcup chamber 108 and are separated by centrifugal forces, because the air has less density than the dirt, it flows into the center area of the dustcup chamber 108 where it travels upward, attracted by the negative pressure area proximate to the filter 124. The air travels past the screen element 197 and then through the open cell filter 124 and enters the plenum chamber 200, while minute debris is blocked by the filter. The plenum chamber 200 is defined by the sealed space between the cyclone module 118 and the plenum chamber member 116, and provides, a communication path for filtered air from the dustcup chamber 108 to the dustcup passageway 110. Because the plenum chamber 200 is in fluid communication with the top of the clean passageway 110 of the dustcup 106, filtered air proceeds to the motor intake and is ultimately routed into a HEPA filter element 199 before it is exhausted to atmosphere.

To empty the contents collected inside the dustcup 106 the operator must pull the spring-loaded latch 178 that is located on the front side of the top cover 176. The latch 178 is provided with a latch projection 179 that disengages from a latch projection receptacle 173 provided in the front handle bracket 172. Once the latch projection 179 clears the latch projection receptacle 173, the top cover 176 and the top-hinged support 174 are free to pivot upwardly and are biased in this direction under influence of a coiled compression spring 183 nested between the front handle bracket 172 and the top-hinged support 174. When the top cover 176 and top-hinged support 174 pivot upwardly the outer flange skirt 177 of the top-hinged support 174 raises and allows the dustcup 106 to be removed without this intended interference. The operator grasps the handle 112 of the dustcup 106 and removes the dustcup 106 by pivoting it away from the rear housing 102. There is slight pressure required to release the dustcup 106 from the housing 102 as the projection 138 on plenum chamber member 116 is designed to create a slight interference fit with the underside of the top wall in the rear housing 102 to prevent the dustcup 106 from unintentionally falling out of the unit. To empty the dustcup 106 the operator must grasp the handle 115 attached to the top of the plenum chamber member 116 and lift upward. The plenum chamber member 116, cyclone module 118 and filter assembly 114 will come out from the inside of the dustcup 106 allowing easy emptying of contents. If cleaning of the filter 124 is also needed at this time the operator must turn the filter receptacle 126 by grasping the cylindrical lower portion 194 thereof and rotating the receptacle 126 through the minimal arc sufficient to disengage the mounting hooks 121 from the inverted channels 154. This action causes the filter assembly 114 to be released from the cyclone module 118. The filter assembly 114 can then be removed for final cleaning and servicing. After the filter assembly 114 is cleaned, it can be re-installed by reversing the foregoing directions for disassembly. The plenum/cyclone assembly can then be re-positioned inside the dustcup 106 and the cup 106 can then be reinstalled into the rear housing 102.

Because the hose connector is mounted into the pivoting cover assembly, the hose connector disengages the intake chimney 175 of the top-hinged support 174 when opened and re-seals to the intake chimney 175 after the cover 176 is positioned in the closed position. When the cover 176 is in the fully closed (down) position the perimeter flange 177 resides on the outside of the upper flange of the dustcup 106, thus holding the dustcup 106 in the proper operating position without fear that the cup 106 will fall from the unit. As noted hereinbefore, the hose connector mates with the chimney extension 175 of the top cover to provide air continuity in the sealed system.

While the preferred embodiment of the invention has been described above, it will be recognized and understood that various modifications may be made therein and the appended claims are intended to cover all such modifications which may fall within the spirit and scope of the invention.

What is claimed is:

1. A vacuum cleaner comprising:
   a base configured for movement on a floor;
   a dirty air inlet in the base;
   a rear housing extending from and pivotally attached to the base;
   a handle mounted on the rear housing at a location distal from the base;
   a dust cup assembly selectively connectable to the rear housing, the dust cup assembly comprising:
      a dust cup assembly inlet configured to convey air into the dust cup assembly, the dust cup inlet being fluidly connected to the dirty air inlet when the dust cup assembly is connected to the rear housing;
      a dust cup assembly outlet configured to convey air out of the dust cup assembly;
      a filter system selectively positioned between the dust cup assembly inlet and the dust cup assembly outlet;

a dust cup chamber configured to receive dirt separated by the filter system, the dust cup chamber having a top, a bottom, and a sidewall extending from the top to the bottom; and a pair of extensions extending exterior to the dust cup chamber from opposite lateral portions of the sidewall; and a vacuum suction source mounted in the vacuum cleaner, the vacuum suction source being fluidly connected to the dust cup assembly outlet and selectively operable to draw air through the dust cup assembly.

2. The vacuum cleaner of claim 1, wherein the pair of extensions extend from the top of the dust cup chamber to the bottom of the dust cup chamber.

3. The vacuum cleaner of claim 1, wherein the dust cup assembly is selectively connectable to a front face of the rear housing, and the pair of extensions each comprise a first portion that extends laterally with respect to a forwards-backwards direction of the rear housing, and a second portion that extends backwards towards the rear housing.

4. The vacuum cleaner of claim 1, wherein the dust cup assembly is selectively connectable to a front face of the rear housing, and the pair of extensions turn backwards towards the rear housing.

5. The vacuum cleaner of claim 1, wherein the pair of extensions form concave channels extending along each side of the dust cup chamber, the concave channels facing a side of the dust cup chamber that faces the rear housing when the dust cup assembly is connected to the rear housing.

6. The vacuum cleaner of claim 1, wherein the top of the dust cup chamber comprises an opening, and the dust cup assembly comprises a lid that is selectively connectable to the opening to close the dust cup chamber.

7. The vacuum cleaner of claim 6, wherein the dust cup assembly outlet extends through the lid.

8. The vacuum cleaner of claim 7, wherein the filter system is connected to the lid to cover the dust cup assembly outlet.

9. The vacuum cleaner of claim 8, wherein the dust cup assembly inlet extends through the lid.

10. The vacuum cleaner of claim 6, wherein the dust cup assembly inlet extends through the lid.

11. The vacuum cleaner of claim 1, wherein the filter system comprises a plurality of filter media.

12. The vacuum cleaner of claim 11, wherein the filter system comprises at least one screen and at least one additional filter positioned downstream of the at least one screen.

13. A vacuum cleaner comprising:
a base configured for movement on a floor;
a dirty air inlet in the base;
a rear housing extending from and pivotally attached to the base;
a handle mounted on the rear housing at a location distal from the base;
a vacuum source;
a filter system having an air inlet in fluid communication with the dirty air inlet and an outlet in fluid communication with a vacuum source, the vacuum source being selectively operable to draw air into the dirty air inlet and through the filter system;
a dust cup chamber selectively connectable to the rear housing and configured to receive dirt separated by the filter system, the dust cup chamber comprising:
a top, a bottom, and a sidewall extending from the top to the bottom; and
a pair of extensions extending exterior to the dust cup chamber from opposite lateral portions of the sidewall.

14. The vacuum cleaner of claim 13, wherein the pair of extensions extend from the top of the dust cup chamber to the bottom of the dust cup chamber.

15. The vacuum cleaner of claim 13, wherein the dust cup chamber is selectively connectable to a front face of the rear housing, and the pair of extensions each comprise a first portion that extends laterally with respect to a forwards-backwards direction of the rear housing, and a second portion that extends backwards towards the rear housing.

16. The vacuum cleaner of claim 13, wherein the dust cup chamber is selectively connectable to a front face of the rear housing, and the pair of extensions turn backwards towards the rear housing.

17. The vacuum cleaner of claim 13, wherein the pair of extensions form concave channels extending along each side of the dust cup chamber, the concave channels facing a side of the dust cup chamber that faces the rear housing when the dust cup assembly is connected to the rear housing.

18. The vacuum cleaner of claim 13, wherein the top of the dust cup chamber comprises an opening, and the dust cup assembly comprises a lid that is selectively connectable to the opening to close the dust cup chamber.

19. A vacuum cleaner comprising:
a housing;
a vacuum source in the housing;
a dirty air inlet;
a filter system having an air inlet in fluid communication with the dirty air inlet and an outlet in fluid communication with a vacuum source, the vacuum source being selectively operable to draw air into the dirty air inlet and through the filter system;
a dust cup chamber selectively connectable to the housing and being configured to receive dirt separated by the filter system, the dust cup chamber comprising:
a top, a bottom, and a sidewall extending from the top to the bottom; and
a pair of extensions extending exterior to the dust cup chamber from opposite lateral portions of the sidewall.

20. The vacuum cleaner of claim 19, wherein the filter system is selectively connectable to the housing and configured to be received in the dust cup chamber when the filter system and the dust cup chamber are connected to the housing.

* * * * *